United States Patent
Wu et al.

(10) Patent No.: US 11,681,434 B2
(45) Date of Patent: Jun. 20, 2023

(54) METHOD AND APPARATUS FOR SETTING VIRTUAL KEYS, MEDIUM, AND ELECTRONIC DEVICE

(71) Applicant: Tencent Technology (Shenzhen) Company Limited, Shenzhen (CN)

(72) Inventors: Haiyang Wu, Shenzhen (CN); Shili Xu, Shenzhen (CN); Jingjing Chen, Shenzhen (CN); Qitian Zhang, Shenzhen (CN); Yanhui Lu, Shenzhen (CN); Kai Hong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/980,445

(22) Filed: Nov. 3, 2022

(65) Prior Publication Data

US 2023/0046679 A1    Feb. 16, 2023

Related U.S. Application Data

(63) Continuation of application No. PCT/CN2022/074584, filed on Jan. 28, 2022.

(30) Foreign Application Priority Data

Feb. 8, 2021    (CN) .......................... 202110181295.7

(51) Int. Cl.
  *G06F 3/04886*    (2022.01)
  *G06F 3/01*       (2006.01)
(52) U.S. Cl.
  CPC .......... *G06F 3/04886* (2013.01); *G06F 3/016* (2013.01); *G06F 2203/04808* (2013.01)

(58) Field of Classification Search
  CPC ................. G06F 3/04886; G06F 3/016; G06F 2203/04808
  See application file for complete search history.

(56) References Cited

U.S. PATENT DOCUMENTS

| 9,740,381 B1 * | 8/2017 | Chaudhri ............ G06F 3/04817 |
| 11,128,636 B1 * | 9/2021 | Jorasch .................. A61B 5/369 |

(Continued)

FOREIGN PATENT DOCUMENTS

| CN | 101950243 A | 1/2011 |
| CN | 102467330 A | 5/2012 |

(Continued)

OTHER PUBLICATIONS

Tencent Technology, ISR, PCT/CN2022/074584, Apr. 8, 2022, 2 pgs.

*Primary Examiner* — Tadesse Hailu
(74) *Attorney, Agent, or Firm* — Morgan, Lewis & Bockius LLP

(57) ABSTRACT

The present disclosure relates to the technical field of computers, and provides a method and apparatus for setting virtual keys on a user interface performed by an electronic device. The method includes: determining, in response to at least two touch operations acting on a user interface, at least two pieces of operation position information of the at least two touch operations; identifying, according to the at least two pieces of operation position information, a target virtual key on the user interface; obtaining a target vibration waveform corresponding to the target vibration key, and performing waveform similarity calculation on the target vibration waveform and other vibration waveforms adapted to at least one other virtual key on the user interface to obtain a waveform difference value; and when the waveform difference value is greater than a predefined threshold, determin- (Continued)

ing that the target vibration waveform is associated with the target virtual key.

20 Claims, 10 Drawing Sheets

(56) References Cited

U.S. PATENT DOCUMENTS

| | | | | |
|---|---|---|---|---|
| 2010/0164869 A1* | 7/2010 | Huang | ................... | G06F 3/043 |
| | | | | 345/168 |
| 2011/0285653 A1* | 11/2011 | Kojima | ............... | G06F 3/04883 |
| | | | | 345/173 |
| 2013/0088439 A1* | 4/2013 | Shih | ....................... | G06F 3/016 |
| | | | | 345/173 |
| 2014/0078102 A1* | 3/2014 | Araki | ................. | G06F 3/04845 |
| | | | | 345/174 |
| 2019/0339858 A1* | 11/2019 | Wang | ................... | G06F 3/0488 |
| 2021/0117080 A1* | 4/2021 | Wang | ................ | G06F 3/04845 |

FOREIGN PATENT DOCUMENTS

| | | |
|---|---|---|
| CN | 110503013 A | 11/2019 |
| CN | 110703952 A | 1/2020 |

\* cited by examiner

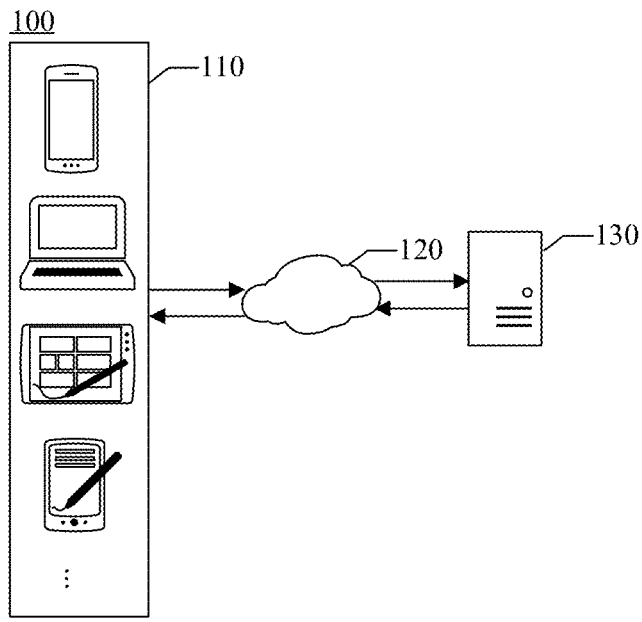

FIG. 1

Determine, in response to at least two touch operations acting on a user interface, at least two operation position information of the at least two touch operations — S210

Perform region definition processing on the at least two operation position information to obtain a predefined touch region, and perform region response on the predefined touch region to obtain a response touch region — S220

Determine, in response to touch regions on the user interface being provided with other virtual keys, a vibration effect for the target virtual key to obtain a target vibration waveform corresponding to the vibration effect, and perform waveform similarity calculation on the target vibration waveform and other vibration waveforms adapted to the other virtual keys to obtain a waveform difference value — S230

Identify, according to the waveform difference value being greater than a predefined threshold, the vibration effect to obtain an identification processing result, and determine, according to the identification processing result, that the target vibration waveform is adapted to the target virtual key — S240

FIG. 2

METHOD AND APPARATUS FOR SETTING VIRTUAL KEYS, MEDIUM, AND ELECTRONIC DEVICE

CROSS-REFERENCE TO RELATED APPLICATIONS

This application is a continuation application of PCT Patent Application No. PCT/CN2022/074584, entitled "METHOD AND APPARATUS FOR SETTING VIRTUAL KEY, MEDIUM, AND ELECTRONIC DEVICE" filed on Jan. 28, 2022, which claims priority to Chinese Patent Application No. 202110181295.7, filed with the State Intellectual Property Office of the People's Republic of China on Feb. 8, 2021, and entitled "METHOD AND APPARATUS FOR SETTING VIRTUAL KEYS, MEDIUM, AND ELECTRONIC DEVICE", all of which are incorporated herein by reference in their entirety.

FIELD OF THE TECHNOLOGY

The present disclosure relates to the technical field of computers, in particular to a method for setting virtual keys, an apparatus for setting virtual keys, a computer-readable medium, and an electronic device.

BACKGROUND OF THE DISCLOSURE

At present, during user interaction with a user interface displayed on a terminal, a user usually locates user interface elements visually, and acts on the user interface elements through touch operations to produce visual feedback responses. However, when visually impaired users such as the blind use this interaction method, they cannot accurately locate and view feedback, resulting in such users being unable to interact with the user interface properly.

SUMMARY

The present disclosure aims to provide a method for setting virtual keys, an apparatus for setting virtual keys, a non-transitory computer-readable medium, and an electronic device. By determining, in response to at least two touch operations acting on a user interface, at least two pieces of operation position information of the at least two touch operations, and identifying, according to the at least two pieces of operation position information, a target virtual key on the user interface, the target virtual key suitable for physiological characteristics and touch operation habits of a user may be generated on the user interface according to finger differences of the user and a touch operation method for the electronic device, thereby assisting the user in interacting with the user interface quickly and accurately without visual intervention of the user. In addition, by adapting differentiated vibration effects for different virtual keys, the user can perform tactile perception and distinguishing after operating the different virtual keys, which assists the user in identifying operation feedback, thereby reliably guiding further user interaction with the user interface.

According to one aspect of the embodiments of the present disclosure, a method for setting virtual keys on a user interface is provided, and includes: determining, in response to at least two touch operations acting on a user interface, at least two pieces of operation position information of the at least two touch operations;

identifying, according to the at least two pieces of operation position information, a target virtual key on the user interface;

in response to touch regions on the user interface being provided with other virtual keys, determining a vibration effect for the virtual key to obtain a target vibration waveform corresponding to the vibration effect, and performing waveform similarity calculation on the target vibration waveform and other vibration waveforms adapted to at least one other virtual key on the user interface to obtain a waveform difference value; and when the waveform difference value is greater than a predefined threshold, determining that the target vibration waveform is associated with the target virtual key.

According to one aspect of the embodiments of the present disclosure, an apparatus for setting virtual keys is provided, and includes: an information obtaining module, configured to determine, in response to at least two touch operations acting on a user interface, at least two pieces of operation position information of the at least two touch operations;

a touch region module, configured to determine a predefined touch region on the user interface associated with the at least two pieces of operation position information;

a key generation module, configured to generate, according to the predefined touch region, a touch region as a target virtual key on the user interface;

a waveform calculation module, configured to determine, in response to touch regions on the user interface being provided with other virtual keys, a vibration effect for the virtual key to obtain a target vibration waveform corresponding to the vibration effect, and perform waveform similarity calculation on the target vibration waveform and other vibration waveforms adapted to the other virtual keys to obtain a waveform difference value; and a waveform adaption module, configured to, when the waveform difference value is greater than a predefined threshold, determine that the target vibration waveform is associated with the target virtual key.

According to an aspect of the embodiments of the present disclosure, a non-transitory computer-readable medium is provided, storing executable instructions, the executable instructions, when executed by a processor of an electronic device, causing the electronic device to implement the method for setting virtual keys on a user interface in the foregoing technical solutions.

According to an aspect of the embodiments of the present disclosure, an electronic device is provided, including: a processor and a memory, configured to store executable instructions of the processor; the processor being configured to execute the executable instructions and causing the electronic device to perform the method for setting virtual keys on a user interface in the foregoing technical solutions.

BRIEF DESCRIPTION OF THE DRAWINGS

The accompanying drawings herein, which are incorporated into the specification and constitute a part of this specification, show embodiments that conform to the present disclosure, and are used for describing a principle of the present disclosure together with this specification. Apparently, the accompanying drawings in the following description show merely some embodiments of the present disclosure, and a person of ordinary skill in the art may still derive other accompanying drawings from these accompanying drawings without creative efforts. In the accompanying drawings:

FIG. 1 shows a schematic diagram of an exemplary system architecture to which a technical solution of the present disclosure is applied.

FIG. 2 schematically shows a flow chart of steps of a method for setting virtual keys in some embodiments of the present disclosure.

DESCRIPTION OF EMBODIMENTS

Figure 3:
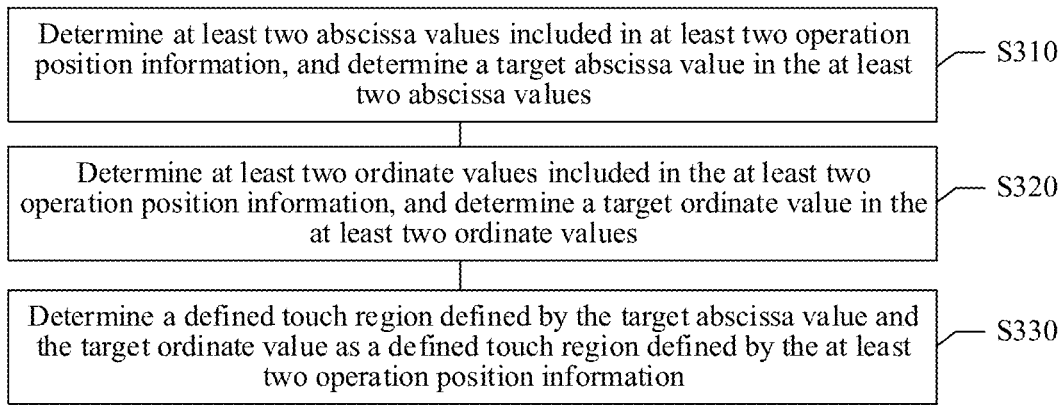
FIG. 3 schematically shows a flow chart of steps of a method for region definition processing in some embodiments of the present disclosure.

Exemplary implementations are now described more comprehensively with reference to the accompanying drawings. However, the examples of implementations may be implemented in multiple forms, and it should not be understood as being limited to the examples of implementations described herein. Conversely, the implementations are provided to make the present disclosure more comprehensive and complete, and comprehensively convey the idea of the examples of the implementations to a person skilled in the art.

In addition, the described features, structures, or characteristics may be combined in one or more embodiments in any appropriate manner. In the following descriptions, more specific details are provided to provide a comprehensive understanding of the embodiments of the present disclosure. However, a person skilled in the art is to be aware of that, the technical solutions in the present disclosure may be implemented without one or more of the particular details, or other methods, unit, apparatus, or step may be adopted. In other cases, well-known methods, apparatuses, implementations, or operations are not shown or described in detail, to avoid obscuring the aspects of the present disclosure.

In related technologies in the art, a player can act on user interface (UI) elements visible on a terminal screen through touch operations while interacting with a current terminal, especially while playing game on a mobile terminal. For example, the direction in which a character moves in the virtual environment can be controlled by a wheel button in the lower left corner of the screen, and virtual shooting can be performed in the virtual environment through gun keys on the right and upper left corner of the screen. This interaction method requires the player to stare at the terminal screen, and after visually positioning an UI element, tap or slide the UI element through a touch medium such as a finger to manipulate the game. However, this game interaction solution is not suitable for visually impaired players such as the blind, who cannot quickly locate game operation buttons on the screen visually. The game operation buttons are UI elements displayed at a fixed position in a game of a terminal device such as a mobile terminal with a user interface. When the player taps the UI elements, the game may respond accordingly. Therefore, normal players can quickly locate the game operation buttons on the screen visually, and then tap or slide the game operation buttons to manipulate the game. If touch events such as taps and slides are generated outside a response region of the game operation buttons, the game may ignore the touch events, which often occurs for visually impaired players. In addition, the output of the game is usually visual, and visually impaired players cannot capture response feedback of the game visually, so it is difficult to produce normal game interaction.

Based on the problems in the above solutions, the present disclosure provides a new method for setting virtual keys, an apparatus for setting virtual keys, a computer-readable medium, and an electronic device.

FIG. 1 shows a schematic diagram of an exemplary system architecture to which a technical solution of the present disclosure is applied.

As shown in FIG. 1, a system architecture 100 may include a terminal 110, a network 120, and a server 130. The terminal 110 and the server 130 are connected by using a network 120.

The terminal 110 may be a smartphone, a tablet computer, a notebook computer, a desktop computer, a smart speaker, a smartwatch, or the like, but is not limited thereto. The network 120 may be a communication medium of various connection types capable of providing a communication link between the terminal 110 and the server 130, for example, may be a wired communication link, a wireless communication link, or a fiber optic cable, which is not limited in this application. The server 130 may be an independent physical server, or may be a server cluster comprising a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

Specifically, the terminal 110 determines, in response to at least two touch operations acting on the user interface, at least two pieces of operation position information of the at least two touch operations. Then, a predefined touch region on the user interface associated with the at least two pieces of operation position information is determined, and a response touch region is generated as virtual keys on the user interface according to the defined touch region. The terminal 110 may determine, in response to touch regions on the user interface being provided with other virtual keys, a vibration effect for the virtual keys to obtain a target vibration waveform corresponding to the vibration effect, and perform waveform similarity calculation on the target vibration waveform and other vibration waveforms adapted to the other virtual keys to obtain a waveform difference value. The terminal 110 may identify, according to the waveform difference value, the vibration effect to obtain an identification processing result, and determine, according to the identification processing result, that the target vibration waveform is adapted to the target virtual key.

In addition, the method for setting virtual keys in the embodiment of the present disclosure may be applied to the terminal or the server, which is not particularly limited in the present disclosure. The embodiment of the present disclosure is mainly described by taking the method for setting virtual keys applied to the terminal 110 as an example.

The method for setting virtual keys, the apparatus for setting virtual keys, the computer-readable medium, and the electronic device provided in the present disclosure will be described in detail below with reference to specific embodiments.

FIG. 2 schematically shows a flow chart of steps of a method for setting virtual keys in some embodiments of the present disclosure. As shown in FIG. 2, the method for setting virtual keys may mainly include the following steps:

Step S210: Determining, in response to at least two touch operations acting on a user interface, at least two pieces of operation position information of the at least two touch operations.

Step S220: Determining a predefined touch region on the user interface associated with the at least two pieces of operation position information, and generating, according to the predefined touch region, a response touch region as corresponding to a target virtual key on the user interface.

Step S230: Determining, in response to touch regions on the user interface being provided with other virtual keys, a vibration effect for the target virtual key to obtain a target vibration waveform corresponding to the vibration effect, and performing waveform similarity calculation on the target vibration waveform and other vibration waveforms adapted to the other virtual keys on the user interface to obtain a waveform difference value.

Step S240: Identifying, according to the waveform difference value being greater than a predefined threshold, the vibration effect to obtain an identification processing result, and determining, according to the identification processing result, that the target vibration waveform is adapted to the target virtual key.

In the exemplary embodiment of the present disclosure, by determining, in response to the at least two touch operations acting on the user interface, the at least two pieces of operation position information of the at least two touch operations, and generating, according to the predefined touch region on the user interface associated with the at least two pieces of operation position information, the response touch region as the virtual keys, virtual keys suitable for physiological characteristics and touch operation habits of a user may be generated on the user interface according to finger differences of the user and a touch operation method for the electronic device, thereby assisting the user in interacting with the user interface quickly and accurately without visual intervention of the user. In addition, by adapting differentiated vibration effects for different virtual keys, the user can perform tactile perception and distinguishing after operating the different virtual keys, which assists the user in identifying operation feedback, thereby reliably guiding further user interaction with the user interface.

The steps of the method for setting virtual keys will be described in detail below.

In step S210, determining, in response to the at least two touch operations acting on the user interface, the at least two pieces of operation position information of the at least two touch operations.

In the exemplary embodiment of the present disclosure, the user interface (UI) refers to a graphical interface for human-machine interaction. Specifically, the user interface refers to the overall design of human-machine interaction, operation logic, and beautiful interface, and is a medium for interaction and information exchange between a system and users. The user interface realizes conversion between an internal form of information and a form acceptable to human beings. The user interface aims to enable users to operate hardware conveniently and efficiently to achieve two-way interaction, and complete work that the users wish to accomplish with the help of the hardware. The definition of user interface is extensive, including human-machine interaction and graphical user interface. User interfaces exist in all areas of information communication with humans and machines.

Users can act on the user interface in the method of touch operations through a touch medium. The touch medium may be fingers or other media, and the touch operations may be a tap operation, a slide operation, or a long press operation, etc., which are not particularly limited in the exemplary embodiment.

When a user performs a touch operation on the user interface, the terminal 110 may record an acting position of the touch operation to obtain corresponding operation position information.

The operation position information may be characterized by screen coordinates. The screen coordinates are coordinate positions in a screen coordinate system. The screen coordinate system may be a coordinate system on the screen of a terminal such as a mobile phone or a computer, and is defined in pixels. Generally, the lower left corner of the screen is the origin of the screen coordinate system, that is, the point (0,0), and the upper right corner of the screen is (Screen.width, Screen.height), where width is a screen width, and height is a screen height.

When the user acts on the user interface through a plurality of touch operations, the terminal 110 may determine and record at least two pieces of operation position information corresponding to the plurality of touch operations.

In step S220, determining the predefined touch region on the user interface associated with the at least two pieces of operation position information, and generating the response touch region as the virtual keys on the user interface according to the defined touch region.

In the exemplary embodiment of the present disclosure, after obtaining the at least two pieces of operation position information, the terminal 110 may perform region definition processing on the at least two pieces of operation position information to determine the predefined touch region on the user interface associated with the at least two pieces of operation position information.

In one embodiment, FIG. 3 shows a flow chart of steps of a method of region definition processing. As shown in FIG. 3, the method at least includes the following steps: in step S310, determining at least two abscissa values included in the at least two pieces of operation position information, and determining a target abscissa value in the at least two abscissa values.

Since the operation position information is characterized by the screen coordinates in the screen coordinate system, the operation position information includes numerical information of the abscissa and the ordinate. First, the terminal 110 may determine all abscissa values (at least two abscissa values) included in the at least two pieces of operation position information. Further, the terminal 110 determines a minimum abscissa value and a maximum abscissa value of the at least two abscissa values as the target abscissa value.

In step S320, determining at least two ordinate values included in the at least two pieces of operation position information, and determining a target ordinate value in the at least two ordinate values.

Correspondingly, the terminal 110 may first determine all ordinate values (at least two ordinate values) included in the at least two pieces of operation position information, and then determine a minimum ordinate value and a maximum ordinate value of the at least two ordinate values as the target ordinate value.

In step S330, determining a predefined touch region by the target abscissa value and the target ordinate value as the predefined touch region by the at least two pieces of operation position information.

Since the target abscissa value includes the minimum abscissa value and the maximum abscissa value, and the target ordinate value includes the minimum ordinate value and the maximum ordinate value, the terminal 110 may use abscissas and ordinates where the minimum abscissa value, the maximum abscissa value, the minimum ordinate value and the maximum ordinate value are located as line segments, and use a rectangular region enclosed by the four line segments as the predefined touch region by the at least two pieces of operation position information. In addition, other methods of defining the defined touch region according to the target abscissa value and the target ordinate value may be set according to actual requirements, which is not particularly limited in the exemplary embodiment.

In the exemplary embodiment, by using the target abscissa value and the target ordinate value to determine the defined touch region, the defined touch region can be determined accurately, so that virtual keys suitable for physiological characteristics and touch operation habits of the user may be set in the defined touch region subsequently, and the accuracy of user interaction with the user interface is improved.

After the defined touch region is defined, region response processing may be further performed on the defined touch region, so as to generate the response touch region according to the defined touch region.

Figure 4:
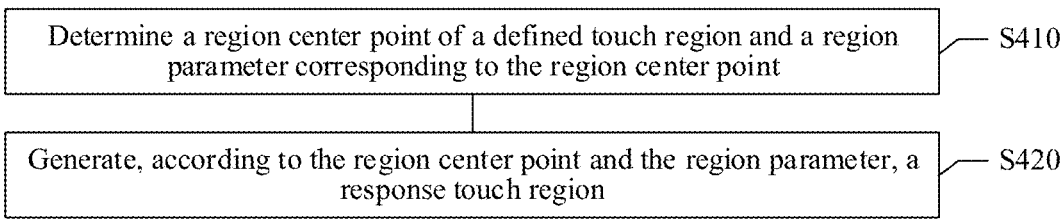
FIG. 4 schematically shows a flow chart of steps of a method for region response processing in some embodiments of the present disclosure.

In one embodiment, FIG. 4 shows a flow chart of steps of a method for region definition processing. As shown in FIG. 4, the method at least includes the following steps: in step S410, determining a region center point of the defined touch region and a region parameter corresponding to the region center point.

When the defined touch region is a rectangle, a center point of the rectangle may be determined according to a minimum abscissa value, a maximum abscissa value, a minimum ordinate value and a maximum ordinate value of the rectangle, as the region center point of the defined touch region. When the defined touch region is another regular graphic or irregular graphic, a center point of the regular graphic or irregular graphic may also be determined as the region center point.

After the region center point is determined, the terminal 110 may obtain a radius value as the region parameter, so as to further determine a circular response touch region. When a response touch region in other shapes, such as a square response touch region, is to be determined according to actual needs, the length of one side or the distance from the center point to the side of the square may also be obtained as the region parameter, which is not particularly limited in the exemplary embodiment. The radius value, the length of one side of the square, or the distance from the center point to the side of the square may be pre-configured and stored in a database of the terminal or server. The terminal 110 may obtain the radius value, the length of one side of the square, or the distance from the center point to the side of the square from the database.

In step S420, generating, according to the region center point and the region parameter, the response touch region.

After the region center point is obtained and the region parameter is a radius, the terminal 110 may define a circular region as the response touch region with the region center point as a center and the region parameter as a radius. When the region center point is obtained, and the region parameter is the distance from the center point to the side of the square, a square region may be defined as the response touch region with the region center point as a center and the distance as a square parameter. When the region parameter is other values, a region may also be correspondingly defined as the response touch region, which is not particularly limited in the exemplary embodiment.

In the exemplary embodiment, the response touch region can be regenerated according to the defined touch region, and the response touch region conforms to the physiological characteristics and touch operation habits of the user, so that the user can accurately perform operations in the response touch region, and the accuracy of user interaction with the user interface is improved.

The defined touch region may be determined only by using operation position information of valid touch operations in the at least two pieces of operation position information.

In the exemplary embodiment of the present disclosure, position distance calculation may be performed on the at least two pieces of operation position information to obtain a corresponding operation position distance. Specifically, calculation may be performed with reference to Formula (1):

$$|AB|=\sqrt{(x_2-x_1)^2+(y_2-y_1)^2} \quad (1)$$

where A and B are two operation position points, operation position information of A is $(x_1, y_1)$, and operation position information of B is $(x_2, y_2)$, and $|AB|$ is an operation position distance between the two points A and B.

In addition, the operation position distance may be calculated according to other calculation methods, which is not particularly limited in the exemplary embodiment. Moreover, when the number of the at least two pieces of operation position information is greater than two, the operation position distance between every two pieces of operation position information may also be calculated according to Formula (1) or other methods.

The at least one operation position distance may be obtained by using one operation position point as a dominant point, and calculating distances between the dominant point and other operation position points.

Figure 5:
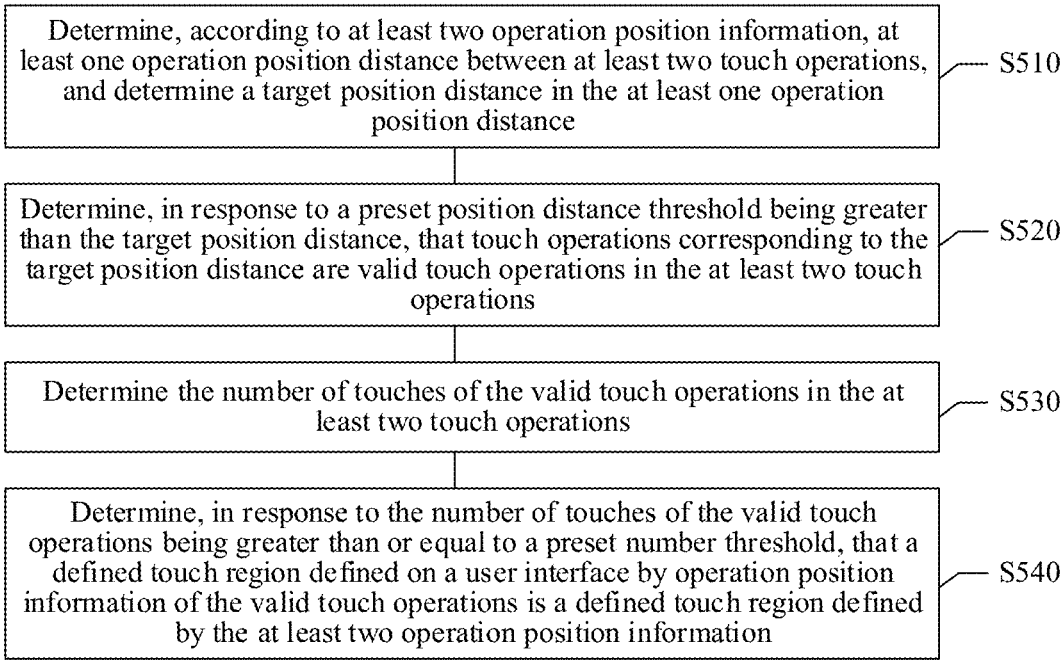
FIG. 5 schematically shows a flow chart of steps of a method for determining a response touch region as virtual keys in some embodiments of the present disclosure.

In one embodiment, FIG. 5 shows a flow chart of steps of a method for determining the predefined touch region on the user interface associated with the at least two pieces of operation position information. As shown in FIG. 5, the method at least includes the following steps: in step S510, determining, according to the at least two pieces of operation position information, at least one operation position distance between the at least two touch operations, and determining a target position distance in the at least one operation position distance.

When there is only one other operation position point near an operation position point, only one operation position distance may be calculated, and the operation position distance may be determined as the target position distance. When there are at least two operation position points near an operation position point, there are at least two operation position distances that may be calculated. The terminal 110 may compare the at least two operation position distances, and determine the smallest operation position distance as the target position distance. Further, the terminal 110 may obtain a preset position distance threshold locally or from the server.

In step S520, determining, in response to the preset position distance threshold being greater than the target position distance, that touch operations corresponding to the target position distance are valid touch operations in the at least two touch operations.

After obtaining the target position distance and the position distance threshold, the terminal 110 may compare the target position distance with the position distance threshold to obtain a comparison result. When the comparison result is that the position distance threshold is greater than the target position distance, the terminal 110 may determine that the touch operation corresponding to the target position distance is a valid touch operation. The touch operations corresponding to the target position distance are touch operations that act on dominant points corresponding to the target position distance.

In step S530, determining the number of touches of the valid touch operations in the at least two touch operations.

After the at least two touch operations are all judged according to steps S510 to S520, the valid touch operations in the at least two touch operations may be determined. Further, the number of the valid touch operations is counted to obtain the number of touches. In addition, the terminal 110 may obtain a preset number threshold locally or from a server.

In step S540, determining, in response to the number of touches of the valid touch operations being equal to or greater than the preset number threshold, that a predefined touch region on the user interface by operation position information of the valid touch operations is the predefined touch region by the at least two pieces of operation position information.

After the number of touches and the corresponding preset number threshold are obtained, the number of touches and the preset number threshold may be compared to obtain a comparison result. When the comparison result is that the number of touches is equal to or greater than the preset number threshold, the response touch region generated by the at least two touch operations may be further determined as a virtual key.

In the exemplary embodiment, by using the operation position information of a certain number of valid touch operations to determine the defined touch region, misoperation or unconventional touch operations produced when the user sets virtual keys can be eliminated as much as possible, so that the defined touch region may be determined more accurately, virtual keys that are more in line with the physiological characteristics and touch operation habits of the user may be set in the defined touch region subsequently, and the accuracy of user interaction with the user interface is further improved.

In step S230, determining, in response to the user interface being provided with the other virtual keys, the vibration effect for the virtual keys to obtain the target vibration waveform, and performing waveform similarity calculation on the target vibration waveform and other vibration waveforms adapted to the other virtual keys to obtain the waveform difference value.

In the exemplary embodiment of the present disclosure, vibration matching processing may be performed on the virtual keys in order to meet an output requirement that the virtual keys may give feedback on the touch operations when the user performs the touch operations on the virtual keys.

Specifically, the terminal 110 may match the vibration effect to the generated virtual keys in a pre-designed vibration effect file. In order to determine whether the vibration effect may be perceived by the user or whether the vibration effect has repeated matches with other vibration effects, a vibration waveform corresponding to the vibration effect may be further obtained from the vibration effect file as the target vibration waveform, so as to identify the vibration effect via the target vibration waveform.

After obtaining the target vibration waveform, the terminal 110 may calculate the waveform difference value between the target vibration waveform and other vibration waveforms adapted to other virtual keys on the user interface, so as to further determine whether the vibration effect of the target vibration waveform is sufficiently differentiated to be distinguished by the user.

Figure 6:
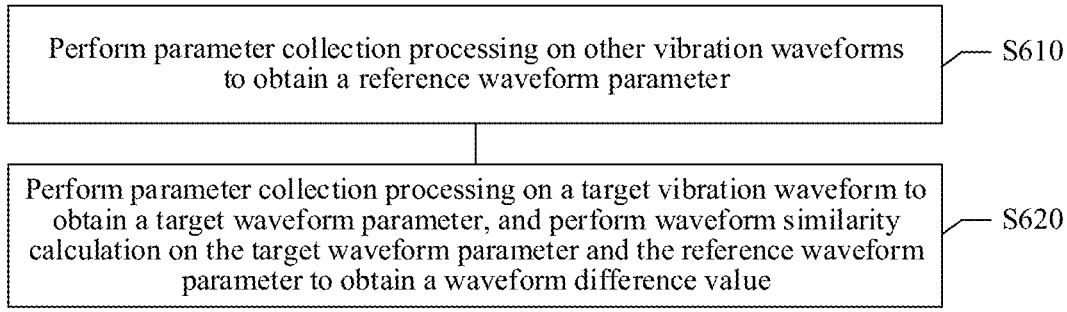
FIG. 6 schematically shows a flow chart of steps of a method for waveform similarity calculation in some embodiments of the present disclosure.

In one embodiment, FIG. 6 shows a flow chart of steps of a method for waveform similarity calculation. As shown in FIG. 6, the method at least includes the following steps: in step S610, performing parameter collection processing on the other vibration waveforms to obtain a reference waveform parameter.

The other vibration waveforms may be other waveforms other than the target vibration waveform in the vibration effect file, or vibration waveforms already matched with other virtual keys in the vibration effect file, which is not particularly limited in the exemplary embodiment.

Further, the terminal 110 may perform parameter collection processing on the other vibration waveforms to obtain the reference waveform parameter. The reference waveform parameter includes frequencies and intensities of the other vibration waveforms, and may also include other parameters, which is not particularly limited in the exemplary embodiment.

Specifically, when there are other vibration waveforms in the vibration effect file, in order to obtain the frequency of the other vibration waveforms, abscissas of the previous peak point and the next peak point of the other vibration waveforms may be collected, that is, a period of the other vibration waveforms, and the reciprocal of the period is further calculated to obtain the frequency of the other vibration waveforms. In addition, the previous trough point and the next trough point of the vibration waveform, or a certain fixed point of the previous waveform period and the corresponding fixed point of the next waveform period may be collected, which is not particularly limited in the exemplary embodiment. In this case, the intensity of the vibration waveform may be obtained by collecting ordinates of the peak point and the trough point of the other vibration waveforms as the intensity of the other vibration waveforms or using other collection or definition methods, which is not particularly limited in the exemplary embodiment.

When other vibration waveforms and corresponding waveform data are stored in the vibration effect file, data such as the intensities and/or frequencies of the corresponding other vibration waveforms are stored in the waveform data, and may be directly obtained from the waveform data.

In step S620, performing parameter collection processing on the target vibration waveform to obtain a target waveform parameter, and performing waveform similarity calculation on the target waveform parameter and the reference waveform parameter to obtain the waveform difference value.

Correspondingly, since the target vibration waveform is also obtained by performing vibration matching processing in the vibration effect file, the target waveform parameter of the target vibration waveform may also be obtained through the same parameter collection processing as in step S610. The target waveform parameter includes a frequency and intensity of the target vibration waveform, and may also include other parameters, which is not particularly limited in the exemplary embodiment.

Further, waveform similarity calculation may be performed on the target waveform parameter and the reference waveform parameter to obtain the waveform difference value.

Figure 7:
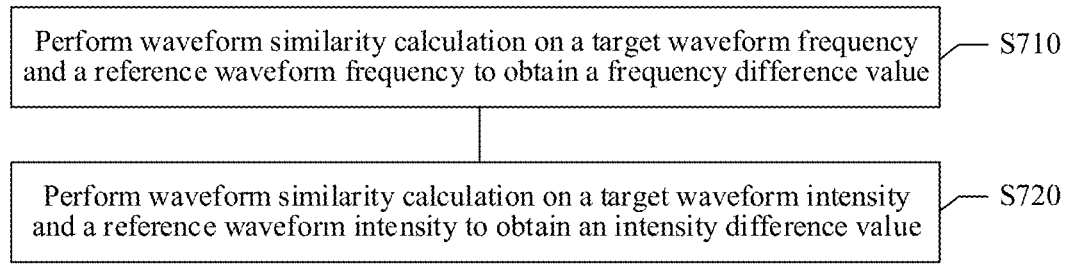
FIG. 7 schematically shows a flow chart of steps of a method for further waveform similarity calculation in some embodiments of the present disclosure.

In one embodiment, the target waveform parameter includes a target waveform frequency and a target waveform intensity, the reference waveform parameter includes a reference waveform frequency and a reference waveform intensity, and the waveform difference value includes a frequency difference value and an intensity difference value. FIG. 7 shows a flow chart of steps of a method for further waveform similarity calculation. As shown in FIG. 7, the method at least includes the following steps: in step S710, performing waveform similarity calculation on the target waveform frequency and the reference waveform frequency to obtain the frequency difference value.

Specifically, waveform similarity calculation may be performed on the target waveform frequency and the reference waveform frequency with reference to Formula (2):

$$d_H(X,Y)=\max\{\sup_{x\in X}\inf_{y\in Y}d(x,y),\sup_{y\in Y}\inf_{x\in X}d(x,y)\} \quad (2)$$

Formula (2) is a calculation formula of Hausdorff distance. The Hausdorff distance measures the distance between compact subsets in a metric space M. X and Y represent that the target waveform frequency and the reference waveform frequency are proper subsets in the metric space M, respectively, and then the Hausdorff distance $d_H(X,Y)$ is the smallest number r such that the closed r-neighborhood of X includes Y, and the closed r-neighborhood of Y also includes X. That is, the Hausdorff distance represents a distance in the metric space M. Therefore, the frequency difference value $d_f$ between the target waveform frequency and the reference waveform frequency may be calculated by Formula (2).

In addition, the frequency difference value may be calculated by Frechet distance. The Frechet distance refers to the shortest maximum distance between two directional curves that cannot be backtracked. Moreover, the Frechet distance may be used for calculating continuous or discrete target waveform frequencies and reference waveform frequencies, with high applicability.

In step S720, performing waveform similarity calculation on the target waveform intensity and the reference waveform intensity to obtain the intensity difference value.

Correspondingly, the intensity difference value $d_s$ between the target waveform intensity and the reference waveform intensity may also be calculated with reference to Formula (2). The intensity difference value may also be calculated according to the Frechet distance, which is not particularly limited in the exemplary embodiment.

In the exemplary embodiment, the waveform similarity calculation may be performed on the target waveform frequency and the reference waveform frequency, as well as on the target waveform intensity and the reference waveform frequency, respectively, to obtain the frequency difference value and the intensity difference value as the waveform difference value. The calculation method is simple and accurate. In this way, on the one hand, a difference between the vibration effect corresponding to the target vibration waveform and the vibration effects corresponding to other vibration waveforms can be accurately determined, and differentiated vibration effect can be adapted for different virtual keys, so that the user can tactilely perceive and distinguish the feedback of the operations; and on the other hand, consumption of computing resources is small.

In step S240, identifying, according to the waveform difference value being greater than a predefined threshold, the vibration effect to obtain an identification processing result, and determining, according to the identification processing result, that the target vibration waveform is adapted to the target virtual key.

In the exemplary embodiment of the present disclosure, after the waveform difference value is obtained, effect identification processing may be further performed on the frequency difference value and the intensity difference value in the waveform difference value to identify the vibration effect.

Figure 8:
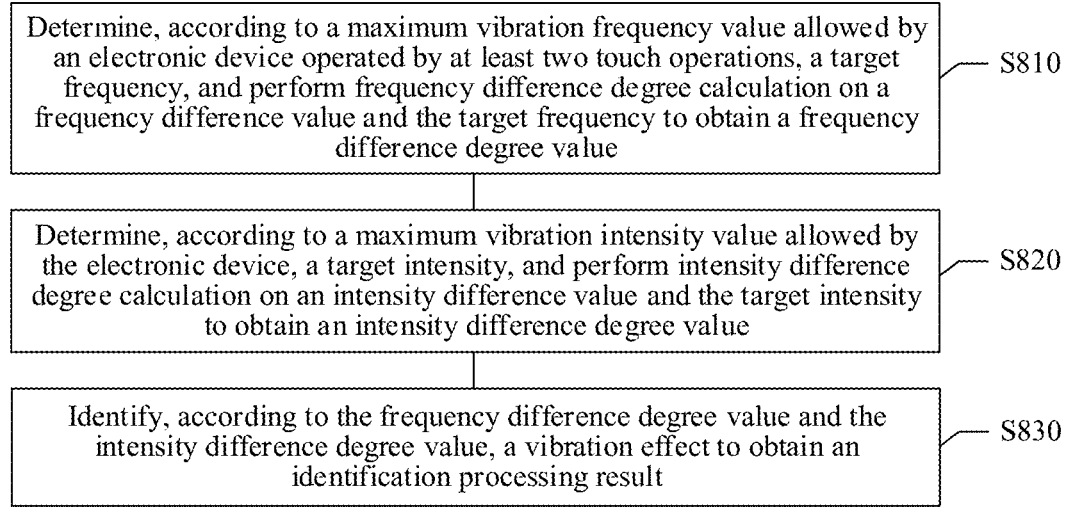
FIG. 8 schematically shows a flow chart of steps of a method for effect recognition processing in some embodiments of the present disclosure.

In one embodiment, FIG. 8 shows a flow chart of steps of a method for effect identification processing. As shown in FIG. 8, the method at least includes the following steps: in step S810, determining, according to a maximum vibration frequency value allowed by the electronic device operated by the at least two touch operations, a target frequency, and performing frequency difference degree calculation on the frequency difference value and the target frequency to obtain a frequency difference degree value.

For example, the target frequency may be the maximum vibration frequency value that may be endured (or allowed) on the terminal device (for example, the terminal 110) operated by the touch operations, or may be set to other target frequency values according to the actual situation, which is not particularly limited in the exemplary embodiment.

Further, the terminal 110 performs frequency difference degree calculation on the frequency difference value and the target frequency to obtain the frequency difference degree value. Specifically, the terminal 110 may obtain the frequency difference degree value by dividing the frequency difference value by the target frequency. The frequency difference degree value may be expressed as a percentage or in other methods, which is not particularly limited in the exemplary embodiment.

In step S820, determining, according to a maximum vibration intensity value allowed by the electronic device, a target intensity, and performing intensity difference degree calculation on the intensity difference value and the target intensity to obtain an intensity difference degree value.

For example, the target intensity may be the maximum vibration intensity value that may be endured (or allowed) on the terminal device (for example, the terminal 110) operated by the touch operations, or may be set to other target intensity values according to the actual situation, which is not particularly limited in the exemplary embodiment.

Further, the terminal 110 performs intensity difference degree calculation on the intensity difference value and the target intensity to obtain the intensity difference degree value. Specifically, the terminal 110 may obtain the intensity difference degree value by dividing the intensity difference value by the target intensity. The intensity difference degree value may be expressed as a percentage or in other methods, which is not particularly limited in the exemplary embodiment.

In step S830, identifying, according to the frequency difference degree value and the intensity difference degree value, the vibration effect to obtain the identification processing result.

The terminal may perform effect identification processing according to the frequency difference degree value and the intensity difference degree value to identify the vibration effect.

Figure 9:
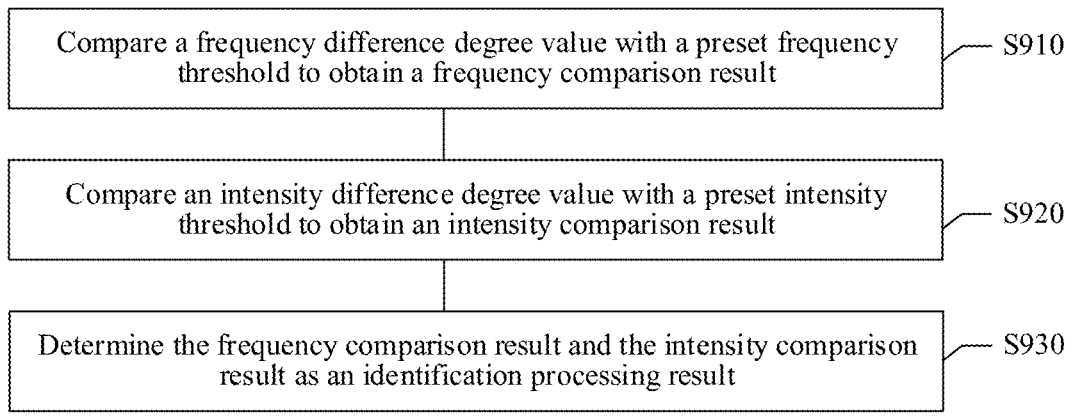
FIG. 9 schematically shows a flow chart of steps of a method for further effect recognition processing in some embodiments of the present disclosure.

In one embodiment, FIG. 9 shows a flow chart of steps of a method for further effect identification processing. As shown in FIG. 9, the method at least includes the following steps: in step S910, comparing the frequency difference degree value with a preset frequency threshold to obtain a frequency comparison result.

The preset frequency threshold may be a percentage or a preset value in other forms, which is not particularly limited in the exemplary embodiment. Preferably, the preset frequency threshold is 30%.

Further, the frequency difference degree value is compared with the preset frequency threshold to determine a relationship between the two values as the frequency comparison result.

In step S920, comparing the intensity difference degree value with a preset intensity threshold to obtain an intensity comparison result.

The preset intensity threshold may be a percentage or a preset value in other forms, which is not particularly limited in the exemplary embodiment. Preferably, the preset intensity threshold is 30%.

In step S930, determining the frequency comparison result and the intensity comparison result as the identification processing result.

The frequency comparison result and the intensity comparison result may be jointly used as the identification processing result after being obtained.

In the exemplary embodiment, the identification processing result is obtained through the frequency comparison result and the intensity comparison result, so that the accuracy and completeness of identification processing results of different vibration effects can be ensured, and vibration effects with great differences can be adapted for different virtual keys to assist the user in tactilely perceiving and distinguishing the feedback of the operations.

After being obtained, the identification processing result may be further judged in order to determine whether the target vibration waveform is adapted to the target virtual key according to the identification processing result.

In one embodiment, when the identification processing result includes that the frequency difference degree value is greater than the preset frequency threshold, and the identification processing result includes that the intensity difference degree value is greater than the preset intensity threshold, the target vibration waveform is determined to be adapted to the target virtual key.

Since the identification processing result includes the frequency comparison result and the intensity comparison result, whether the target vibration waveform is adapted to the target virtual key may be determined from the frequency comparison result and the intensity comparison result.

Specifically, only when the frequency comparison result is that the frequency difference degree value is greater than the preset frequency threshold, and when the intensity comparison result is that the intensity difference degree value is greater than the preset intensity threshold, may the target vibration waveform be determined to be adapted to the target virtual key. That is, when the user performs a touch operation on the virtual keys in a game, for example, the terminal device may vibrate according to the target vibration waveform for user's perception.

After the target virtual key and the target vibration waveform adapted to the target virtual key are set, an acting region of the virtual keys, that is, the response touch region, may also be updated, so as to solve the problem of different touch regions caused by different actions of the user at different stages of using the terminal.

Figure 10:
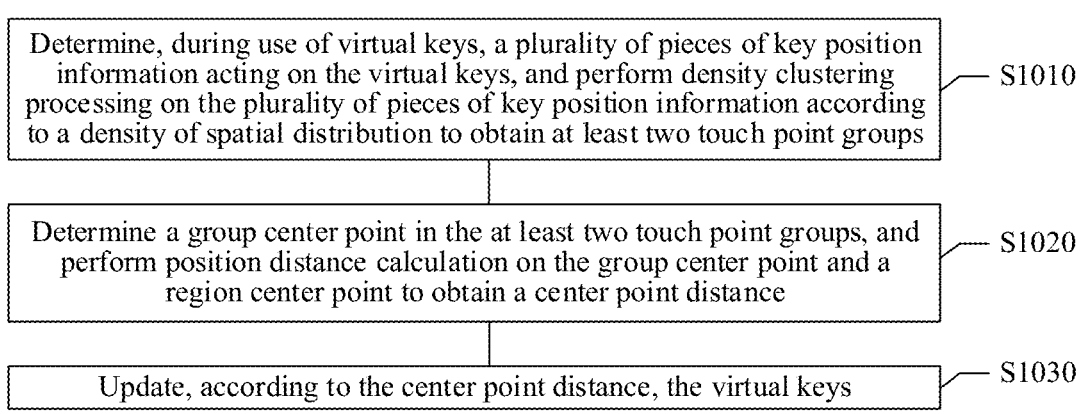
FIG. 10 schematically shows a flow chart of steps of a method for updating virtual keys in some embodiments of the present disclosure.

In one embodiment, FIG. 10 shows a flow chart of steps of a method for updating the virtual keys. As shown in FIG. 10, the method at least includes the following steps: in step S1010, determining, during use of the virtual keys, a plurality of pieces of key position information acting on the virtual keys, and performing density clustering on the plurality of key position information according to a density of spatial distribution to obtain at least two touch point groups.

Since the virtual keys are a response touch region, response positions of the virtual keys are the same with or similar to the size of the response touch region. Therefore, the user can act on a region corresponding to the virtual keys through a touch operation when using the virtual keys (for example, when playing a game). Further, a preset duration may be used as a cycle, and the terminal 110 collects key position information that the user acts on the region corresponding to the virtual keys during the use of the virtual keys in the cycle.

Further, the terminal 110 performs density clustering on the plurality of pieces of key position information to obtain a plurality of touch point groups.

Specifically, the terminal 110 may perform density clustering on the plurality of pieces of key position information by using a density clustering algorithm. According to the density clustering algorithm, assuming that a clustering structure may be determined by the density of sample distribution, clustering is performed based on the density of spatial distribution of a data set. For example, as long as the density of samples in a region is greater than a certain threshold, the samples may be divided into clusters with similar thresholds. The density clustering algorithm examines the connectivity between samples from the perspective of sample density, and continuously expands from connectable samples until a final clustering result is obtained. Therefore, the density clustering algorithm may overcome the situation that K-means( ) algorithm, BIRCH algorithm and the like are only suitable for convex sample sets.

For example, the density clustering algorithm may be a density-based spatial clustering of applications with noise (DBSCAN) algorithm. The DBSCAN algorithm defines a cluster as the largest set of densely connected samples, is able to divide a sufficiently dense region into clusters, does not require a given number of clusters, and may discover clusters in arbitrary shapes in noisy spatial datasets.

The DBSCAN algorithm describes the density of sample distribution based on a set of neighborhood parameters $(\varepsilon, minPts)$. In a given dataset $D=\{x^{(1)}, x^{(2)}, \ldots x^{(m)}\}$, for $x^{(j)} \in D$, $\varepsilon$-neighborhood (eps) represents including all samples, with a distance from $x^{(j)}$ not greater than $\varepsilon$, in D, that is, $N_\varepsilon(x^{(j)})=\{x^{(j)} \in D | dist(x^{(i)}, x^{(j)}) \leq \varepsilon\}$, and minPts represents the minimum number of samples in the $\varepsilon$-neighborhood.

In this step, the $\varepsilon$-neighborhood may be set to 1-3 pixels, and minPts is generally set to 5.

Therefore, when the DBSCAN algorithm is used, any one of the plurality of pieces of key position information may be selected as a seed to create a cluster, all other corresponding key position information is found through the settings of the $\varepsilon$-neighborhood and minPts, an object which is density reachable by merging other key position information is found until all the key position information is accessed, and thus the at least two touch point groups may be obtained.

In addition, density clustering processing may further be performed on the plurality of pieces of key position information by using other density clustering algorithms such as a maximum density clustering algorithm (MDCA), which is not particularly limited in the exemplary embodiment.

In step S1020, determining a group center point in the at least two touch point groups, and performing position distance calculation on the group center point and the region center point to obtain a center point distance.

Figure 11:
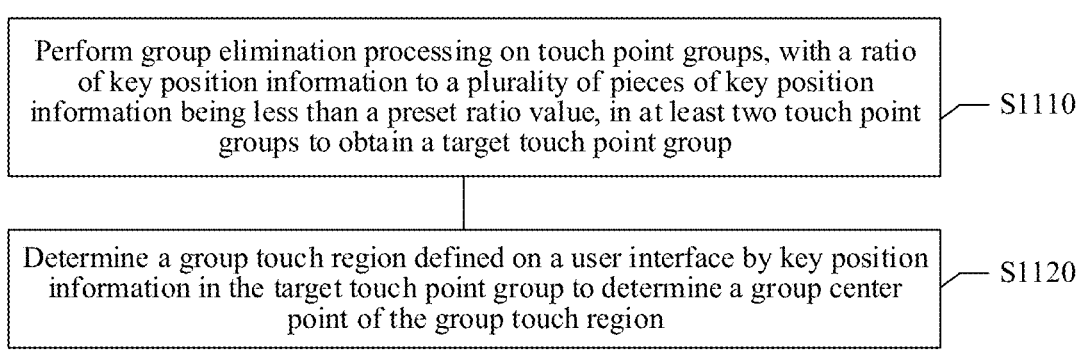
FIG. 11 schematically shows a flow chart of steps of a method for determining a group center point in some embodiments of the present disclosure.

In one embodiment, FIG. 11 shows a flow chart of steps of a method for determining the group center point. As shown in FIG. 11, the method at least includes the following steps: in step S1110, performing group elimination processing on touch point groups, with a ratio of key position information to the plurality of pieces of key position information being less than a preset ratio value, in the at least two touch point groups to obtain a target touch point group.

The cluster of the DBSCAN algorithm may include at least one key position information. If there is only one key position information, other key position information all falls within a $\varepsilon$-neighborhood of the key position information. If there are a plurality of pieces of key position information, there is at least one other key position information in a $\varepsilon$-neighborhood of any key position information, otherwise the two pieces of key position information cannot be density reachable, and a cluster including too little key position information may be considered as noise.

Therefore, in order to determine a target touch point group that is more in line with actual needs, noise points in the at least two touch point groups may be eliminated first. Further, a ratio value of key position information included in a touch point group to all the key position information may be preset, so that when a ratio of key position information included in a certain touch point group to all the key position information is less than the preset ratio value, the touch point group is eliminated, and the target touch point group with a touch point group having insufficient noise points and numerical points eliminated may be obtained.

In step S1120, determining a group touch region defined on the user interface by key position information in the target touch point group to determine the group center point of the group touch region.

After the target touch point group is determined, the group touch region may be defined for the key position information included in the target touch point group according to the method for region definition processing shown in FIG. 3. Preferably, the group touch region is a rectangle. In addition, a center point in the group touch region may be determined as the group center point according to the key position information.

In the exemplary embodiment, by performing group elimination processing on the touch point groups, with the ratio of key position information to the plurality of pieces of key position information being less than the preset ratio value, in the at least two touch point groups, touch point clusters which may be noise may be eliminated to obtain the target touch point group, and then the group center point is obtained according to the key position information in the target touch point group, which improves the accuracy of the determination of the group center point.

After the group center point is determined, position distance calculation may be performed on the group center point and the region center point in the setting process of the virtual keys to obtain the center point distance.

Specifically, the center point distance may be calculated as shown in Formula (1), or in other methods, which is not particularly limited in the exemplary embodiment.

In step S1030, updating, according to the center point distance, the virtual keys.

After the center point distance is obtained, the virtual keys may be updated according to the center point distance and the at least two touch point groups.

Figure 12:
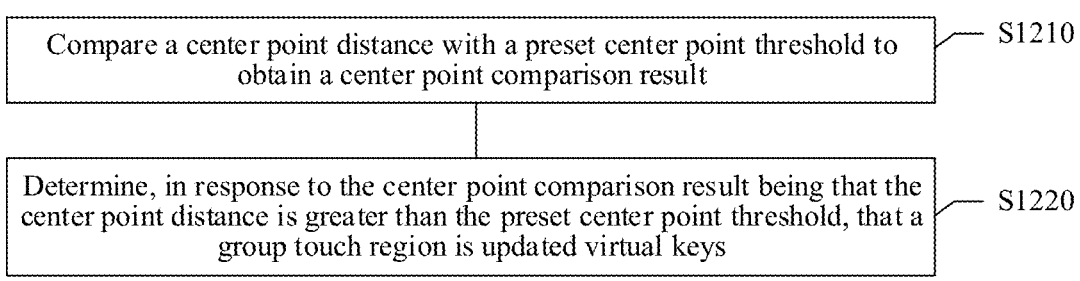
FIG. 12 schematically shows a flow chart of steps of a method for further updating virtual keys in some embodiments of the present disclosure.

In one embodiment, FIG. 12 shows a flow chart of steps of a method for further updating the virtual keys. As shown in FIG. 12, the method at least includes the following steps: in step S1210, comparing the center point distance with a preset center point threshold to obtain a center point comparison result.

The center point threshold may be a preset threshold used for determining whether the center point distance between the group center point and the region center point is large enough to update the virtual keys.

After the center point threshold is obtained, the center point distance may be compared with the center point threshold to determine a comparison result as the center point comparison result.

In step S1220, determining, in response to the center point comparison result being that the center point distance is greater than the preset center point threshold, that the group touch region is updated virtual keys.

When the center point comparison result is that the center point distance is greater than the center point threshold, the center point distance between the group center point and the region center point is far, and current touch operation habits of the user are different from previous touch operation habits when the user sets the virtual keys. The previously set virtual keys are no longer suitable for the current touch operation habits of the user. If the previous virtual keys are still used, invalid touch operations or wrong touch operations may occur. Therefore, by updating the virtual keys, the group touch region may be determined as the updated virtual keys, and the accuracy of user interaction with the user interface may be ensured.

In addition, region response processing may be performed on the group touch region according to the method for region response processing shown in FIG. 4 to obtain a new response touch region, and the new response touch region may be used as the updated virtual keys.

In the exemplary embodiment, generated virtual keys are logically and meticulously updated and determined, and the virtual keys are updated when meeting conditions, so that the accuracy of user interaction with the user interface can be ensured.

The method for setting the virtual keys according to the embodiment of the present disclosure will be described in detail below with reference to a specific application scenario.

Figure 13:
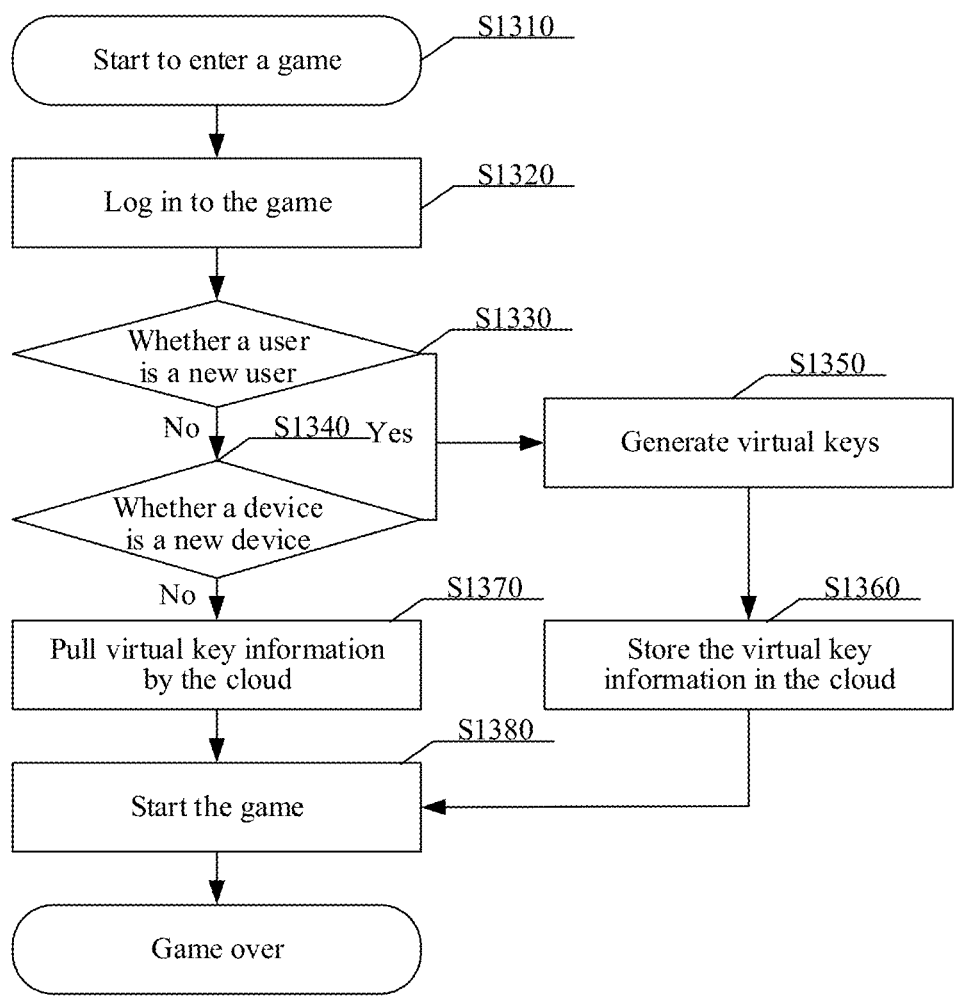
FIG. 13 schematically shows a flow chart of steps of a game life cycle in an application scenario in some embodiments of the present disclosure.

FIG. 13 shows a flow chart of steps of a game life cycle in the application scenario. As shown in FIG. 13, in step S1310, starting to enter a game.

For example, an application scenario of the embodiment of this application is that a certain player plays a game on a certain fixed terminal. Then, when virtual keys are generated for the player, "generating" is an adapting process, and the virtual keys may be a region of the fixed terminal where the player operates the game. With the adapting process, the player may ultimately operate the game on a user interface of the fixed terminal naturally without making errors instead of visually distinguishing virtual keys.

In step S1320, logging in to the game.

The player may log in to the game by entering a game account and password in a game application through the terminal. A specific input method may be voice input, or typing in the game account and password, which is not particularly limited in the exemplary embodiment.

In step S1330, determining whether the player is a new user.

After the player logs in to the game, the game application may determine whether the player is a new user. The game application may include a game application client and a game application server. Specifically, the game application may query registered account information corresponding to the game. When the game account is not included in the registered account information, the player is determined to be a new user. When the game account is included in the registered account information, the player is determined to be an old user.

In step S1340, determining whether the device is a new device.

When the player is an old user, the game application may further determine whether the terminal device used by the player is a new device. Specifically, the terminal device currently used by the player has a device identification, and when the device identification is inconsistent with a device identification bound to the game account of the player, it indicates that the device currently used by the player is a new device. When the device identification is consistent with the device identification bound to the game account of the player, it indicates that the device currently used by the player is a used device.

In step S1350, generating virtual keys.

When the game application determines that the player is a new user, or that the player is an old user but uses a new device, the game application may start to generate the virtual keys.

Figure 14:
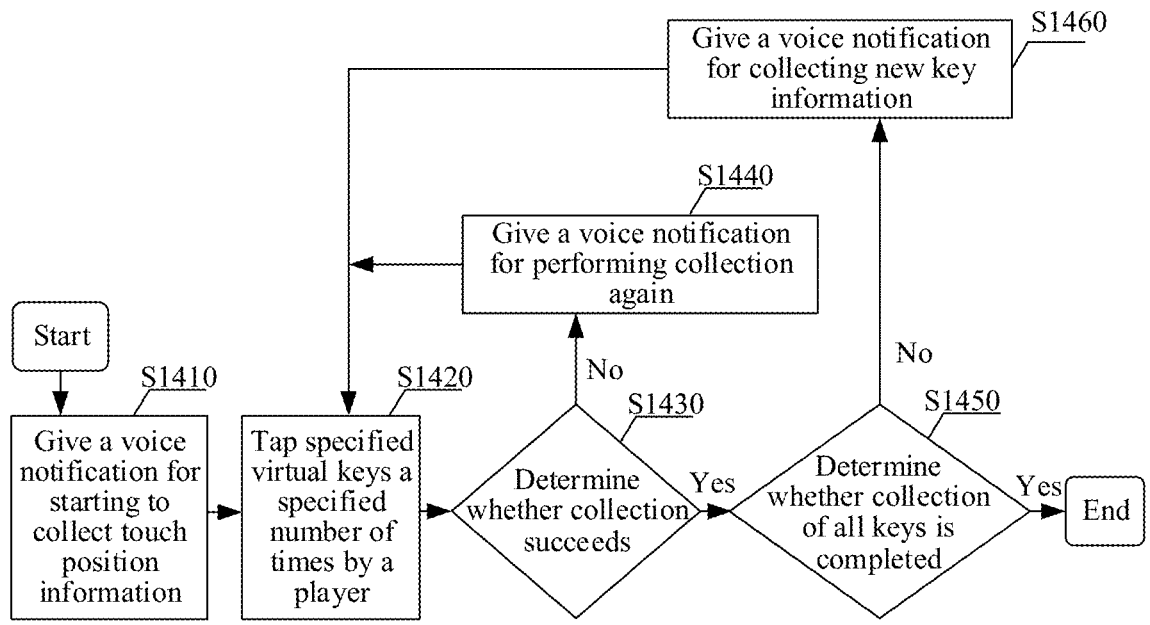
FIG. 14 schematically shows a flow chart of steps of a method for generating virtual keys in an application scenario in some embodiments of the present disclosure.

FIG. 14 shows a flow chart of steps of a method for generating the virtual keys in the application scenario. As shown in FIG. 14, in step S1410, giving a voice notification for starting to collect touch position information.

Due to differences in fingers, different players may have different touch points for each virtual key, so when entering the game for the first time or changing to a new device, each virtual key may be adapted once. A specific method for determining whether the player enters the game for the first time or the player changes to a new device is shown in steps S1330 to S1340, which will not be repeated here.

A voice prompt of the game application may notify the player of touch point positions to be collected of the virtual keys, so as to instruct the player to perform corresponding operations.

Figure 15:
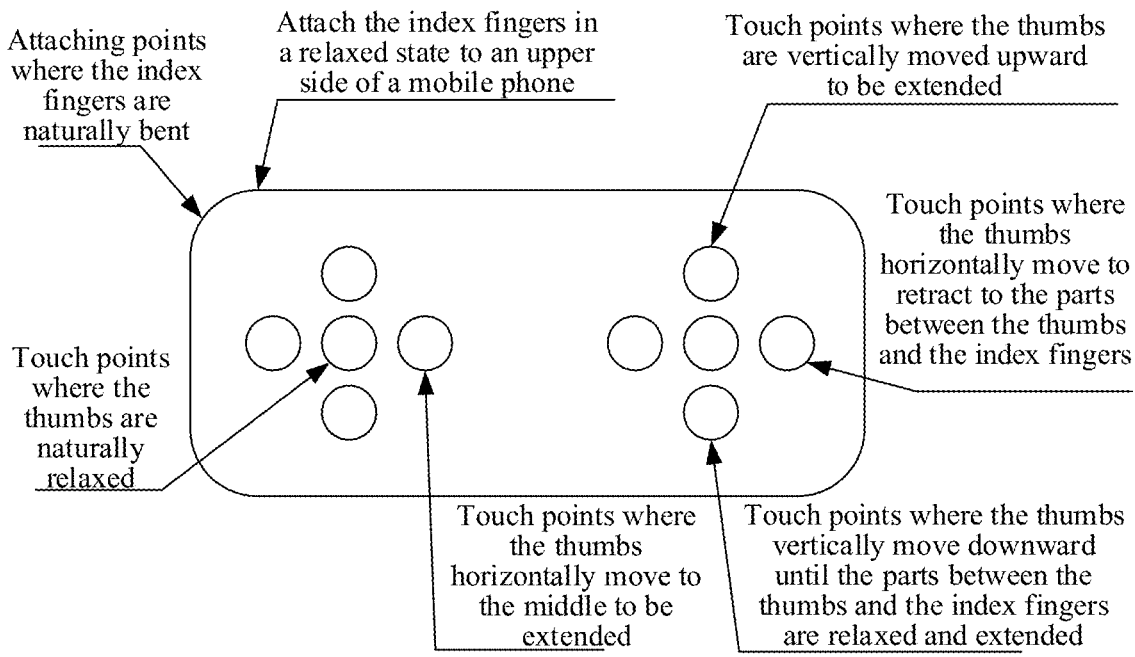
FIG. 15 shows a schematic interface diagram of touch positions of different virtual keys in an application scenario in some embodiments of the present disclosure.

FIG. 15 shows a schematic interface diagram of touch positions of different virtual keys in the application scenario. As shown in FIG. 15, when the terminal device is a mobile phone, the player may hold the mobile phone with both hands horizontally. A hand-holding posture may be that the fingers of both hands, except the thumbs and index fingers, are placed on the back of the mobile phone to hold the mobile phone. The index fingers are naturally attached to an upper side of the mobile phone, and the bending points of the index fingers are attached to top rounded corners of the mobile phone. A moving range of the thumbs on a screen of the mobile phone may be divided into 10 regions, and the 10 regions may be key touch points of the 10 virtual keys to be generated.

For example, touch points where the thumbs are naturally relaxed and bent on the screen are key touch points of middle keys; positions where the thumbs horizontally move to the middle of the screen to be extended and tap the screen are key touch points of inner keys; positions where the thumbs horizontally move outward to retract to the parts between the thumbs and the index fingers are key touch points of outer keys; positions where the thumbs move upward from the middle keys to be extended are key touch points of upper keys; and positions where the thumbs move downward from the middle keys until the parts between the thumbs and the index fingers are relaxed and extended are key touch points of lower keys.

In step S1420, tapping specified virtual keys a specified number of times by the player.

The adapting process is to follow the voice prompt and tap specified key touch points N times on the terminal device. N may be 10 or other values, which may be set according to the actual situation.

When the virtual keys are generated, the user may perform touch operations such as a tap operation at the key touch points of the virtual keys according to the voice prompt, so as to collect corresponding operation position information. The game application client of the mobile phone may record the position of each touch point as the operation position information.

The operation position information may be characterized by screen coordinates. The screen coordinates are the coordinate positions in the screen coordinate system. The screen coordinate system may be a coordinate system on the screen of a terminal such as a mobile phone or a computer, and is defined in pixels. Generally, the lower left corner of the screen is the origin of the screen coordinate system, that is, the point (0,0), and the upper right corner of the screen is (Screen.width, Screen.height), where width is the screen width, and height is the screen height.

In step S1430, determining whether collection succeeds.

The game application determines the operation position information of actions of the player in real time, so that the player may complete touch operations a specified number of times according to the prompt, and the game application client may record the operation position information a specified number of times.

In step S1440, giving a voice notification for performing collection again.

When collection fails, vibration or a voice prompt is generated to prompt the player to perform collection again when operation position information of a touch operation fails to be collected. Specifically, the operation position information of this time may be collected again, or a group of operation position information may be collected again.

After a specified number of pieces of operation position information is collected, region definition processing is performed on the specified number of pieces of operation position information to obtain the defined touch region, and region response processing is performed on the defined touch region to obtain the response touch region.

Specifically, since the operation position information is characterized by the screen coordinates in the screen coordinate system, the operation position information includes numerical information of the abscissa and the ordinate. First, the game application may determine all abscissa values (at least two abscissa values) included in the at least two pieces of operation position information. Further, the game application determines a minimum abscissa value and a maximum abscissa value in the at least two abscissa values as the target abscissa value.

Correspondingly, the game application may first determine all ordinate values (at least two ordinate values) included in the at least two pieces of operation position information, and then determine a minimum ordinate value and a maximum ordinate value of the at least two ordinate values as the target ordinate value.

Since the target abscissa value includes the minimum abscissa value and the maximum abscissa value, and the target ordinate value includes the minimum ordinate value and the maximum ordinate value, the game application may use abscissas and ordinates where the minimum abscissa value, the maximum abscissa value, the minimum ordinate value and the maximum ordinate value are located as line segments, and use a rectangular region enclosed by the four line segments as the defined touch region. In addition, other methods of defining the defined touch region according to the target abscissa value and the target ordinate value may be set according to actual requirements, which is not particularly limited in the exemplary embodiment.

Figure 16:
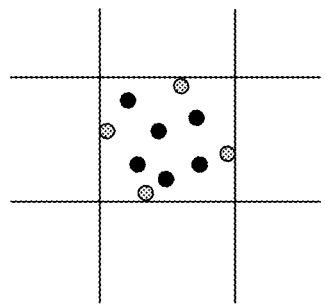
FIG. 16 shows a schematic interface diagram of a defined touch region in an application scenario in some embodiments of the present disclosure.

FIG. 16 shows a schematic interface diagram of the defined touch region in the application scenario. As shown in FIG. 16, gray circles indicate points where four pieces of operation position information where the maximum abscissa, the minimum abscissa, the maximum ordinate and the minimum ordinate are located. When four line segments parallel to the abscissa axis and the ordinate axis are respectively formed by the four points, the four line segments may define a rectangular defined touch region.

Further, when the defined touch region is a rectangle, the game application may determine a center point of the rectangle according to the minimum abscissa value, the maximum abscissa value, the minimum ordinate value and the maximum ordinate value as the region center point of the defined touch region.

After the region center point is determined, the game application may obtain a radius value as the region parameter, so as to further determine a circular response touch region. The radius value may be pre-configured.

After the region center point is obtained and the region parameter is a radius R, the game application may define a circular region as the response touch region with the region center point as a center and the region parameter as a radius. The response touch region is an initial response range of the virtual keys.

The defined touch region may be determined only by using operation position information of valid touch operations in the at least two pieces of operation position information.

Specifically, position distance calculation between the at least two pieces of operation position information may be performed according to Formula (1) to obtain a corresponding operation position distance, or may be performed in other methods, which is not particularly limited in the exemplary embodiment.

The operation position distance may be obtained by using one operation position point as a dominant point, and calculating distances between the dominant point and other operation position points.

The game application may determine an operation position point closest to the dominant point according to the calculated operation position distance, so as to determine the operation position distance between the operation position point and the dominant point as the target position distance. Further, the game application may obtain a position distance threshold D corresponding to the target position distance, and D may be pre-configured.

After obtaining the target position distance and the position distance threshold, the game application may compare the target position distance with the position distance threshold to obtain a comparison result. When the comparison result is that the position distance threshold is greater than the target position distance, the game application may determine that the touch operation corresponding to the target position distance is a valid touch operation. When the comparison result is that the position distance threshold is less than or equal to the target position distance, the game application determines that the other operation position points are noise points.

Figure 17:
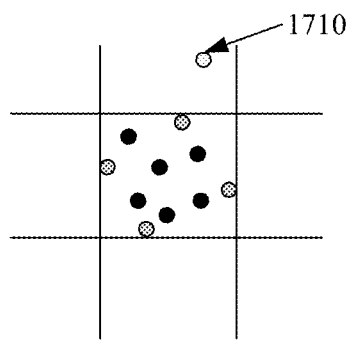
FIG. 17 shows a schematic interface diagram of noise points in an application scenario in some embodiments of the present disclosure.

FIG. 17 shows a schematic interface diagram of the noise points in the application scenario. As shown in FIG. 17, since a distance between 1710 and an operation position point closest thereto exceeds the position distance threshold, 1710 is a noise point, and other operation position points are position points of valid touch operations.

By determining whether position points where N pieces of operation position information are located are valid or not, M valid touch operations may be determined, where M is the number of touches of valid touch operations, and may be configured in advance according to the actual situation.

After the number of touches and the corresponding preset number threshold are obtained, the number of touches and the preset number threshold may be compared to obtain a comparison result. When the comparison result is that the number of touches is equal to or greater than the preset number threshold, that is, M≥N, the defined touch region is determined by the operation position information of the valid touch operations, and the response touch region is generated as the virtual keys according to the defined touch region.

In step S1450, determining whether collection of all keys is completed.

After adapting of current virtual keys is completed, the game application may determine whether collection of all keys is completed. Moreover, each time a virtual key is adapted, the game application may determine whether collection of all keys is completed.

In step S1460, giving a voice notification for collecting new key information.

If there are still virtual keys not subjected to adapting, the game application voice prompts to collect operation position information of the next virtual key, the process in step S1440 may be repeatedly performed until adapting of 10 virtual keys is completed, and then the adapting stage is exited.

In step S1360, storing virtual key information in the cloud.

After the 10 virtual keys are generated, operable key position information of the virtual keys may be stored in the cloud (the game application server), or may be stored in other locations, which is not particularly limited in the exemplary embodiment.

In step S1370, pulling the virtual key information by the cloud.

When the player is not a new user and the terminal used by the player is not a new device, the cloud may directly pull the virtual key information without adapting.

In step S1380, starting the game.

After obtaining the virtual key information, the player may enter the game and operate the virtual keys.

Figure 18:
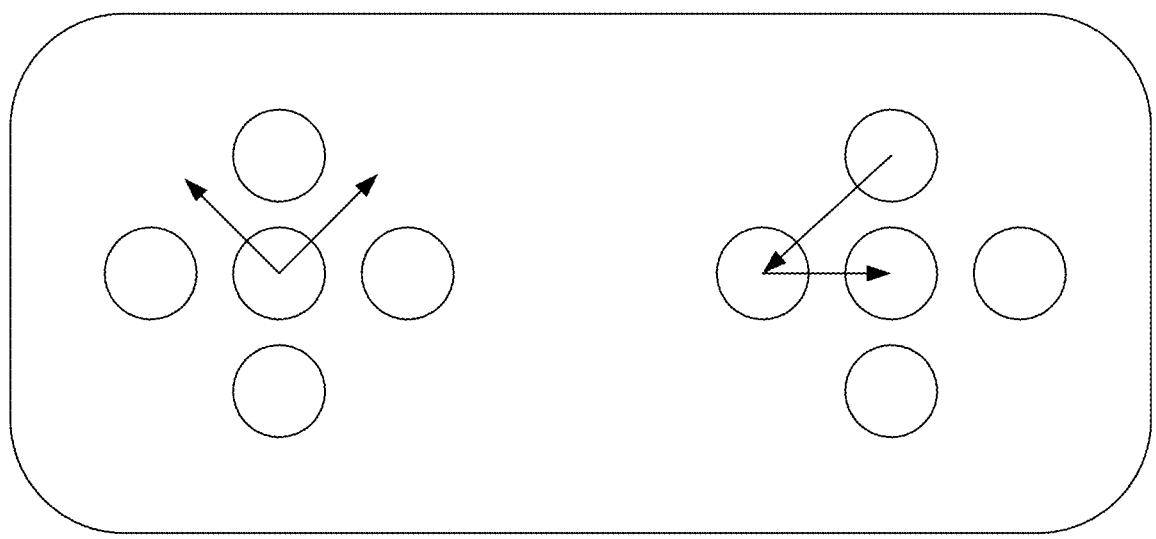
FIG. 18 shows a schematic interface diagram of operating virtual keys in an application scenario in some embodiments of the present disclosure.

FIG. 18 shows a schematic interface diagram of operating the virtual keys in the application scenario. As shown in FIG. 18, the player obtains 10 virtual keys by adapting, and may cover 5 virtual keys with one hand to meet at least 5 types of operation inputs. In addition, complex operations may be performed through a combination of a plurality of virtual keys and a vector sliding operation of a single virtual key. For example, the middle key of the 5 virtual keys of the left hand may be used as a movement input in a certain direction through sliding and direction adjustment, while the right hand may complete the release of complex skills through three-key linked input of the upper virtual key, the inner virtual key and the middle virtual key of the 5 virtual keys.

In the embodiment of this application, the virtual keys are not fixed after being generated, and may also be updated.

This is because an initial response touch region of the virtual keys may not conform to subsequent long-term operation habits of the player. That is, for a virtual key, a valid range generated by frequent taps of the player in the game may be significantly different from the initially adapted response touch region.

Therefore, the game application may take T as a cycle to collect the key position information of the virtual keys within T. T is the game time, and may be configured in advance. When touch operations on each virtual key exceeds NE hours within T, the response touch region of the virtual keys may be verified. After the verification work is completed, the touch operations on each virtual key may be cleared, and NE is cleared. NE may also be configured in advance. If the touch operations on each virtual key do not exceed NE hours within T, the virtual keys do not need to be verified.

The verification process may be to first obtain the plurality of pieces of key position information acting on the virtual keys, and perform density clustering on the plurality of pieces of key position information to obtain the at least two touch point groups. Then, group elimination processing is performed on the at least two touch point groups (see description of FIG. 11) to obtain the target touch point group. Afterwards, a group touch region defined on the user interface by the key position information in the target touch point group is determined, so as to determine the group center point of the group touch region.

Specifically, the game application may perform density clustering on the key position information by using the density clustering algorithm.

The DBSCAN algorithm describes the density of sample distribution based on a set of neighborhood parameters (ε,minPts). In a given dataset D={$x^{(1)}$, $x^{(2)}$, ... $x^{(m)}$}, for $x^{(j)} \in D$, ε-neighborhood (eps) represents including all samples, with a distance from $x^{(j)}$ not greater than ε, in D, that is, $N_\varepsilon(x^{(j)})=\{x^{(j)} \in D | dist(x^{(i)}, x^{(j)}) \le \varepsilon\}$, and minPts represents the minimum number of samples in the ε-neighborhood.

Preferably, the ε-neighborhood may be set to 1-3 pixels, and minPts is generally set to 5.

Therefore, the density clustering algorithm may be, for example, the DBSCAN algorithm. According to the DBSCAN algorithm, any one of the plurality of pieces of key position information may be chosen as a seed to create a cluster, all other corresponding key position information is found through the settings of the ε-neighborhood and minPts, an object which is density reachable by merging other key position information is found until all the key position information is accessed, and thus the at least two touch point groups may be obtained.

The cluster of the DBSCAN algorithm may include at least one key position information. If there is only one key position information, other key position information all falls within a ε-neighborhood of the key position information. If there are a plurality of pieces of key position information, there is at least one other key position information in a ε-neighborhood of any key position information, otherwise the two pieces of key position information cannot be density reachable, and a cluster including too little key position information may be considered as noise.

Therefore, in order to determine a target touch point group that is more in line with actual needs, noise points in the at least two touch point groups may be eliminated first. Further, a ratio value of key position information included in a touch point group to all the key position information may be preset, so that when a ratio of key position information included in a certain touch point group to all the key position information is less than the preset ratio value, the touch point group is eliminated, and the target touch point group with a touch point group having insufficient noise points and numerical points eliminated may be obtained.

After the target touch point group is determined, the group touch region may be defined for the key position information included in the target touch point group according to the method for region definition processing shown in FIG. 3. Preferably, the group touch region is a rectangle. In addition, a center point in the group touch region may be determined as the group center point according to the key position information.

After the group center point is determined, position distance calculation may be performed on the group center point and the region center point in the setting process of the virtual keys to obtain the center point distance.

Specifically, the center point distance may be calculated as shown in Formula (1), or in other methods, which is not particularly limited in the exemplary embodiment.

A center point threshold a corresponding to the center point distance is determined, and a center point comparison result is obtained by comparing the center point distance with the center point threshold.

The center point threshold may be a preset threshold used for determining whether the center point distance between the group center point and the region center point is large enough to update the virtual keys.

After the center point threshold is obtained, the center point distance may be compared with the center point threshold to determine a comparison result as the center point comparison result.

When the center point comparison result is that the center point distance is greater than the center point threshold, the center point distance between the group center point and the region center point is long, and current touch operation habits of the user are different from previous touch operation habits when the user sets the virtual keys. The previously set virtual keys are no longer suitable for the current touch operation habits of the user, and if the previous virtual keys are still used, invalid touch operations or wrong touch operations may occur, so that the virtual keys need to be updated to ensure the accuracy of user interaction with the user interface. At this time, the group touch region may be determined as the updated virtual keys.

In addition, region response processing may be performed on the group touch region according to the method for region response processing shown in FIG. 4 to obtain a new response touch region, and the new response touch region may be used as the updated virtual keys.

Because each time the player performs the touch operation of tap or slide while playing the game, a corresponding touch event may be sent to the game application or other applications, so that the game application or other applications may determine whether the touch event is valid, and then decide whether to respond. When the key position information of the player acts on response touch regions of two or more virtual keys at the same time, that is, a touch event belongs to a plurality of virtual keys at the same time, the game may treat the touch event as an invalid input event and may not respond. At the same time, the player may also be voice prompted of abnormal operations.

After the virtual keys are generated or updated, the problem that the game needs to feed back a result to the player after player inputs also needs to be solved. For visually impaired players such as the blind, in addition to sound feedback, feedback may also be provided for the player through vibration.

Vibration identification is different from current experience assistance scenarios. For example, screen keys simulate the tactile experience of physical keys through vibration for the purpose of distinguishing. Every time the player inputs a touch operation on the screen, the game may have a corresponding feedback scenario. Each feedback scenario has a corresponding life cycle in which a vibration effect may be played for the player to identify.

In order to feedback the vibration effect to the player, a vibration effect file may be generated. The vibration effect file may describe atomic vibration effects. Different vibration waveforms are described in the vibration effect file, without repetition and with a high degree of distinguishing.

Figure 19:
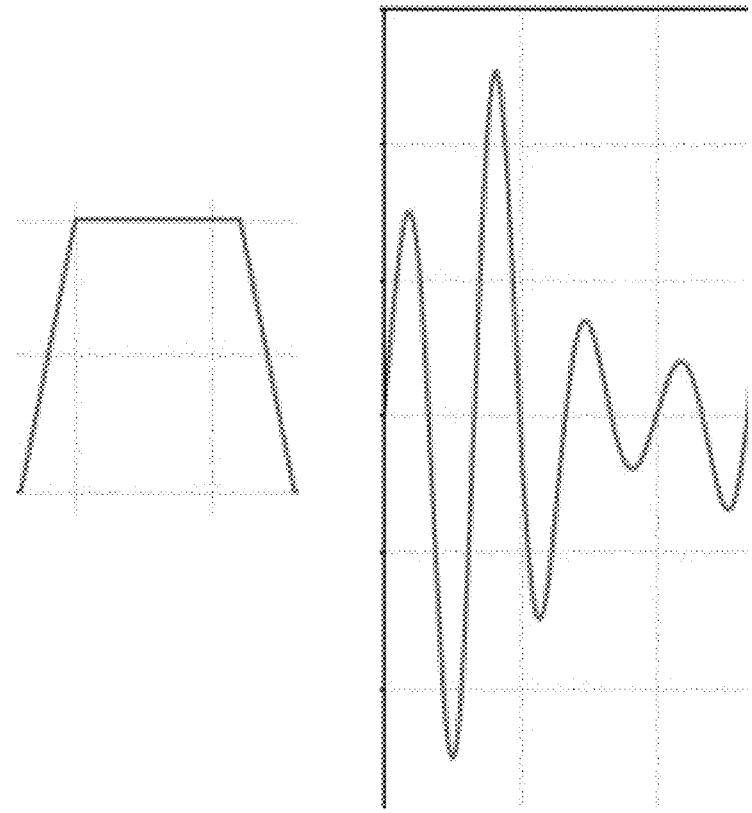
FIG. 19 schematically shows a waveform diagram of atomic vibration effects of two vibration waveforms in an application scenario in some embodiments of the present disclosure.

FIG. 19 shows a waveform diagram of atomic vibration effects of two vibration waveforms in the application scenario. As shown in FIG. 19, the two vibration waveforms describe two distinct and highly differentiated waveforms.

For vibration waveforms of the same atomic vibration effect, playback time may be divided into normal playback and full playback. Generally, the playback time may be set to normal playback, that is, a duration for the atomic vibration effect to be played out. However, the player may also choose full playback, that is, the vibration waveforms are kept playing until a feedback scenario ends.

Figure 20:
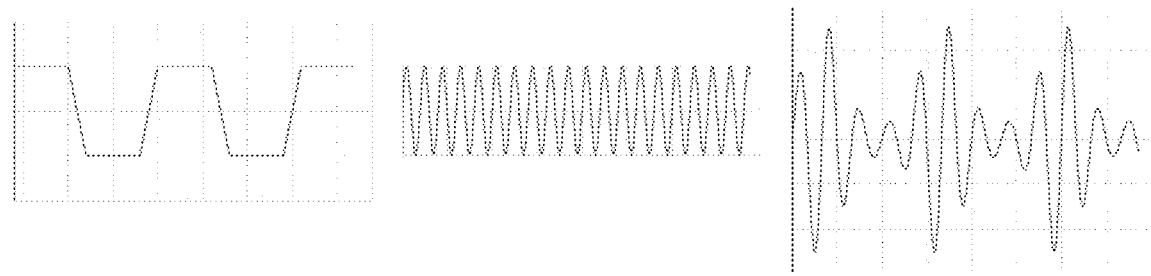
FIG. 20 schematically shows a waveform diagram when three vibration waveforms are fully played in an application scenario in some embodiments of the present disclosure.

FIG. 20 shows a waveform diagram when three vibration waveforms are fully played in the application scenario. As shown in FIG. 20, each of the three vibration waveforms may be played back and forth during full playback until the feedback scenario ends.

Moreover, for the same vibration waveform, vibration frequencies and vibration intensities may be divided into a low level, a medium level and a high level, and an original effect may be set to the medium level. In addition, the frequency or intensity of the vibration waveforms may be adjusted.

When the player feels that the vibration time is too short to distinguish, the player may set a single feedback scenario to full playback, or set all feedback scenarios to full playback. When the player feels that the vibration frequency or intensity is insufficient or too strong and may affect the hand feeling, the player may adjust the vibration frequency or intensity for the feedback scenario, or uniformly set the vibration frequency or intensity for all feedback scenarios.

Figure 21:
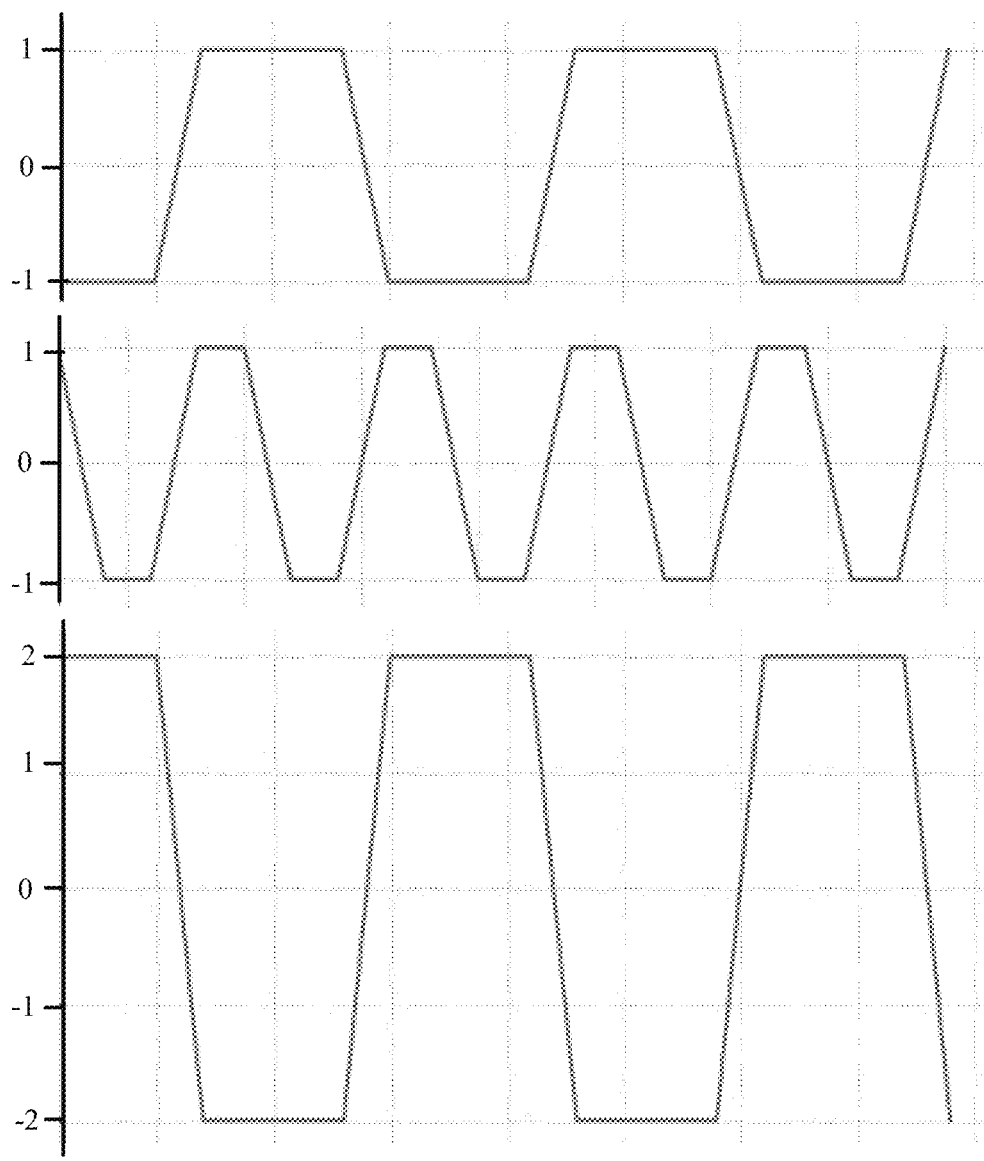
FIG. 21 schematically shows a waveform comparison diagram of adjusting an original vibration waveform in an application scenario in some embodiments of the present disclosure.

FIG. 21 shows a waveform comparison diagram of adjusting an original vibration waveform in the application scenario. As shown in FIG. 21, a top waveform diagram is a waveform diagram of the original vibration waveform, a middle waveform diagram may be obtained by adjusting the frequency of the original vibration waveform, and a bottom waveform diagram may be obtained by adjusting the intensity of the original vibration waveform.

The original vibration waveform can be adjusted by voice, so that the entire playback process can be adjusted uniformly, so as to avoid poor experience caused by repeated adjustments performed by the player.

In this way, a target vibration waveform may be matched for generated or updated virtual keys in the vibration effect file. In order to determine whether the matched vibration waveform may be distinguished from other vibration waveforms, the similarity of vibration effects of the target vibration waveform and other vibration waveforms may be determined.

For the vibration effects, a vibration waveform is presented essentially, so that the Hausdorff distance may be used for determining.

The other vibration waveforms may be other waveforms other than the target vibration waveform in the vibration effect file, or vibration waveforms already matched with other virtual keys in the vibration effect file, which is not particularly limited in the exemplary embodiment.

Further, parameter collection processing may be performed on the other vibration waveforms to obtain the reference waveform parameter. The reference waveform parameter includes frequencies and intensities of the other vibration waveforms, and may also include other parameters, which is not particularly limited in the exemplary embodiment.

Specifically, when there are other vibration waveforms in the vibration effect file, in order to obtain the frequency of the other vibration waveforms, abscissas of the previous peak point and the next peak point of the other vibration waveforms may be collected, that is, a period of the other vibration waveforms, and the reciprocal of the period is further calculated to obtain the frequency of the other vibration waveforms. In addition, the previous trough point and the next trough point of the vibration waveform, or a certain fixed point of the previous waveform period and the corresponding fixed point of the next waveform period may be collected, which is not particularly limited in the exemplary embodiment. In this case, the intensity of the vibration waveform may be obtained by collecting ordinates of the peak point and the trough point of the other vibration waveforms as the intensity of the other vibration waveforms or using other collection or definition methods, which is not particularly limited in the exemplary embodiment.

When other vibration waveforms and corresponding waveform data are stored in the vibration effect file, data such as the intensities and/or frequencies of the corresponding other vibration waveforms are stored in the waveform data, and may be directly obtained from the waveform data.

Correspondingly, since the target vibration waveform is also obtained by performing vibration matching processing in the vibration effect file, the target waveform parameter of the target vibration waveform may also be obtained through the same parameter collection processing as in step S610. The target waveform parameter includes a frequency and intensity of the target vibration waveform, and may also include other parameters, which is not particularly limited in the exemplary embodiment.

Further, waveform similarity calculation may be performed on the target waveform parameter and the reference waveform parameter to obtain the waveform difference value.

Specifically, waveform similarity calculation may be performed on the target waveform frequency and the reference waveform frequency through the Hausdorff distance with reference to Formula (2). The Hausdorff distance measures the distance between compact subsets in a metric space M. X and Y represent that the target waveform frequency and the reference waveform frequency are proper subsets in the metric space M, respectively, and then the Hausdorff distance $_H$ (X, Y) is the smallest number r such that the closed r-neighborhood of X includes Y, and the closed r-neighborhood of Y also includes X. That is, the Hausdorff distance represents a distance in the metric space M. Therefore, the frequency difference value $_f$ between the target waveform frequency and the reference waveform frequency may be calculated by Formula (2). In addition, the frequency difference value may be calculated by Frechet distance.

Correspondingly, the intensity difference value $_s$ between the target waveform intensity and the reference waveform intensity may also be calculated with reference to Formula (2). The intensity difference value may also be calculated according to the Frechet distance, which is not particularly limited in the exemplary embodiment.

Further, the frequency difference degree value is obtained by obtaining the target frequency corresponding to the frequency difference value, and performing frequency difference degree calculation on the frequency difference value and the target frequency. The target frequency may be the maximum vibration frequency value that may be endured (or allowed) on the terminal device operated by the touch operations, or may be set to other target frequency values according to the actual situation, which is not particularly limited in the exemplary embodiment.

The frequency difference degree value is obtained by performing frequency difference degree calculation on the frequency difference value and the target frequency. Specifically, the frequency difference degree value may be obtained by dividing the frequency difference value by the target frequency. The frequency difference degree value may be expressed as a percentage.

The intensity difference degree value is obtained by obtaining the target intensity corresponding to the intensity difference value, and performing intensity difference degree calculation on the intensity difference value and the target intensity.

The target intensity may be the maximum vibration intensity value that may be endured (or allowed) on the terminal device operated by the touch operations, or may be set to other target intensity values according to the actual situation, which is not particularly limited in the exemplary embodiment.

Further, the intensity difference degree value is obtained by performing intensity difference degree calculation on the intensity difference value and the target intensity. Specifically, the intensity difference degree value may be obtained by dividing the intensity difference value by the target intensity. The intensity difference degree value may be expressed as a percentage.

The frequency comparison result is obtained by obtaining a preset frequency threshold corresponding to the frequency difference degree value, and comparing the frequency difference degree value with the preset frequency threshold.

Corresponding to the frequency difference degree value, the preset frequency threshold may be a percentage or a preset value in other forms, which is not particularly limited in the exemplary embodiment. Preferably, the preset frequency threshold is 30%.

Further, the frequency difference degree value is compared with the preset frequency threshold to determine a relationship between the two values as the frequency comparison result.

Correspondingly, the intensity comparison result is obtained by obtaining a preset intensity threshold corresponding to the intensity difference degree value, and comparing the intensity difference degree value with the preset intensity threshold.

Corresponding to the intensity difference degree value, the preset intensity threshold may be a percentage or a preset value in other forms, which is not particularly limited in the exemplary embodiment. Preferably, the preset intensity threshold is 30%.

The frequency comparison result and the intensity comparison result may be jointly used as the identification processing result after being obtained. When the identification processing result includes that the frequency difference degree value is greater than the preset frequency threshold, and the identification processing result includes that the intensity difference degree value is greater than the preset intensity threshold, the target vibration waveform is determined to be adapted to the target virtual key. That is, when touch operations are performed on the virtual keys subsequently, the terminal device may vibrate according to the target vibration waveform for user's perception.

Based on the above application scenarios, in the method for setting the virtual keys according to the embodiments of the present disclosure, on the one hand, the virtual keys are generated more accurately and conveniently through the touch operations of the user, and further, different users can independently generate virtual keys adapted to the users according to finger differences and operation habits without viewing the screen, which is more friendly to visually impaired users, and has a wider range of application scenarios. On the other hand, the target vibration waveform corresponding to the virtual keys is adapted to provide the user with non-visual output feedback, so that the user can perform perception without viewing the screen, which is more intelligent and automated.

Although the steps of the method in the present disclosure are described in a specific order in the accompanying drawings, this does not require or imply that the steps have to be performed in the specific order, or all the steps shown have to be performed to achieve an expected result. Additionally or alternatively, some steps may be omitted, a plurality of steps may be combined into one step, and/or one step may be decomposed into a plurality of steps for execution, and the like.

The following describes apparatus embodiments of the present disclosure, and the apparatus embodiments may be used for performing the method for setting virtual keys in the foregoing embodiment of the present disclosure. For details not disclosed in the apparatus embodiments of the present disclosure, reference may be made to the foregoing method for setting virtual keys in the embodiments of the present disclosure.

Figure 22:
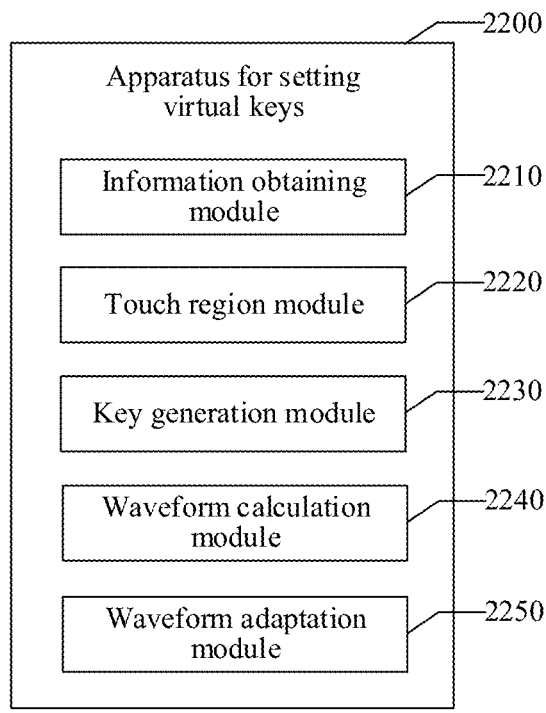
FIG. 22 schematically shows a structural block diagram of an apparatus for setting virtual keys in some embodiments of the present disclosure.

FIG. 22 schematically shows a structural block diagram of an apparatus for setting virtual keys in some embodiments of the present disclosure. As shown in FIG. 22, the apparatus 2200 for setting the virtual keys may include: an information obtaining module 2210, a touch region module 2220, a key generation module 2230, a waveform calculation module 2240, and a waveform adaptation module 2250.

The information obtaining module 2210 is configured to determine, in response to at least two touch operations acting on a user interface, at least two pieces of operation position information of the at least two touch operations. The touch region module 2220 is configured to determine a predefined touch region on the user interface associated with the at least two pieces of operation position information. The key generation module 2230 is configured to generate, according to the defined touch region, a response touch region as virtual keys on the user interface. The waveform calculation module 2240 is configured to determine, in response to touch regions on the user interface being provided with other virtual keys, a vibration effect for the virtual keys to obtain a target vibration waveform corresponding to the vibration effect, and perform waveform similarity calculation on the target vibration waveform and other vibration waveforms adapted to the other virtual keys to obtain a waveform difference value. The waveform adaption module 2250 is configured to identify, according to the waveform difference value being greater than the predefined threshold, the vibration effect to obtain an identification processing result, and determine, according to the identification processing result, that the target vibration waveform is adapted to the target virtual key.

In some embodiments of the present disclosure, the waveform calculation module includes: a reference parameter sub-module, configured to perform parameter collection processing on the other vibration waveforms to obtain a reference waveform parameter; and a parameter calculation sub-module, configured to perform parameter collection processing on the target vibration waveform to obtain a target waveform parameter, and perform waveform similarity calculation on the target waveform parameter and the reference waveform parameter to obtain the waveform difference value.

In some embodiments of the present disclosure, the parameter calculation sub-module includes: a frequency difference unit, configured to perform waveform similarity calculation on a target waveform frequency and a reference waveform frequency to obtain a frequency difference value; and an intensity difference unit, configured to perform waveform similarity calculation on a target waveform intensity and a reference waveform intensity to obtain an intensity difference value.

In some embodiments of the present disclosure, the waveform adaption module includes: a frequency degree sub-module, configured to determine, according to a maximum vibration frequency value allowed by an electronic device operated by the at least two touch operations, a target frequency, and perform frequency difference degree calculation on the frequency difference value and the target frequency to obtain a frequency difference degree value;

an intensity degree sub-module, configured to determine, according to a maximum vibration intensity value allowed by the electronic device, a target intensity, and perform intensity difference degree calculation on the intensity difference value and the target intensity to obtain an intensity difference degree value; and an effect identification sub-module, configured to identify, according to the frequency difference degree value and the intensity difference degree value, the vibration effect to obtain the identification processing result.

In some embodiments of the present disclosure, the effect identification sub-module includes: a frequency comparison unit, configured to compare the frequency difference degree value with a preset frequency threshold to obtain a frequency comparison result;

an intensity comparison unit, configured to compare the intensity difference degree value with a preset intensity threshold to obtain an intensity comparison result; and a processing result unit, configured to determine the frequency comparison result and the intensity comparison result as the identification processing result.

In some embodiments of the present disclosure, the waveform adaption module includes: a waveform adaption unit, configured to determine, in response to the identification processing result including that the frequency difference degree value is greater than the preset frequency threshold, and the identification processing result including that the intensity difference degree value is greater than the preset intensity threshold, that the target vibration waveform is adapted to the target virtual key.

In some embodiments of the present disclosure, the key generation module includes: a distance threshold sub-module, configured to determine, according to the at least two pieces of operation position information, at least one operation position distance between the at least two touch operations, determine a target position distance in the at least one operation position distance, and obtain a preset position distance threshold corresponding to the target position distance;

a valid touch sub-module, configured to determine, in response to the preset position distance threshold being greater than the target position distance, that touch operations corresponding to the target position distance are valid touch operations in the at least two touch operations;

a touch number sub-module, configured to determine the number of touches of the valid touch operations in the at least two touch operations; and a key determining sub-module, configured to determine, in response to the number of touches of the valid touch operations being equal to or greater than a preset number threshold, that a predefined touch region by operation position information of the valid touch operations is the predefined touch region by the at least two pieces of operation position information.

In some embodiments of the present disclosure, the touch region module includes: a parameter determining sub-module, configured to determine a region center point of the defined touch region and a region parameter corresponding to the region center point; and a parameter response sub-module, configured to generate, according to the region center point and the region parameter, the response touch region.

In some embodiments of the present disclosure, the apparatus for setting the virtual keys further includes: a density clustering module, configured to determine, during use of the virtual keys, a plurality of pieces of key position information acting on the virtual keys, and perform density clustering on the plurality of pieces of key position information according to a density of spatial distribution to obtain at least two touch point groups;

a distance calculation module, configured to determine a group center point in the at least two touch point groups, and perform position distance calculation on the group center point and the region center point to obtain a center point distance; and a key updating module, configured to update, according to the center point distance, the virtual keys.

In some embodiments of the present disclosure, the distance calculation module includes: a group elimination sub-module, configured to perform group elimination processing on touch point groups, with a ratio of key position information to the plurality of pieces of key position information being less than a preset ratio value, in the at least two touch point groups to obtain a target touch point group; and a center determining sub-module, configured to determine a group touch region defined on the user interface by key position information in the target touch point group to determine a group center point of the group touch region.

In some embodiments of the present disclosure, the key updating module includes: a threshold comparison sub-module, configured to compare the center point distance with a preset center point threshold to obtain a center point comparison result; and a greater-than result sub-module, configured to determine, in response to the center point comparison result being that the center point distance is greater than the preset center point threshold, that the group touch region is updated virtual keys.

In some embodiments of the present disclosure, the touch region module includes: a coordinate determining sub-module, configured to determine at least two abscissa values included in the at least two pieces of operation position information, and determine a target abscissa value in the at least two abscissa values;

an information determining sub-module, configured to determine at least two ordinate values included in the at least two pieces of operation position information, and determine a target ordinate value in the at least two ordinate values; and a coordinate definition sub-module, configured to determine a predefined touch region by the target abscissa value and the target ordinate value as the predefined touch region by the at least two pieces of operation position information.

The specific details of the apparatus for setting the virtual keys according to the embodiments of the present disclosure have been described in detail in the corresponding method embodiments, which will not be repeated here.

Figure 23:
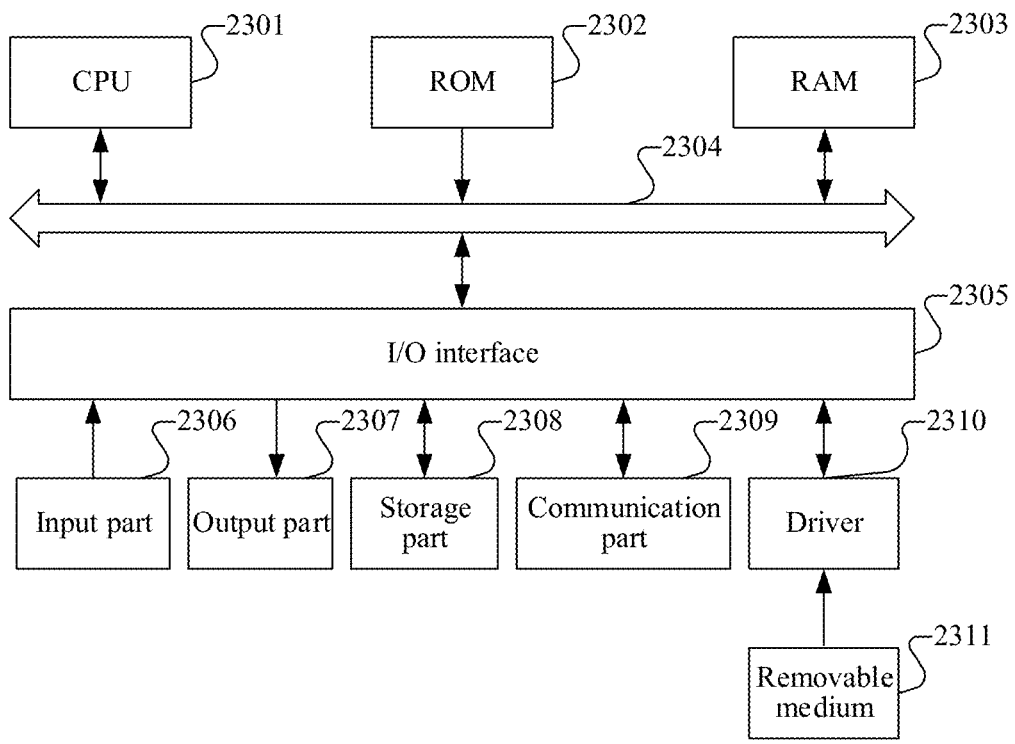
FIG. 23 schematically shows a schematic structural diagram of a computer system adapted to implement an electronic device according to an embodiment of the present disclosure.

FIG. 23 is a schematic structural diagram of a computer system adapted to implement an electronic device according to an embodiment of the present disclosure.

It is to be noted that The computer system 2300 of the electronic device shown in FIG. 23 is merely an example, and does not constitute any limitation on functions and use ranges of the embodiments of the present disclosure.

As shown in FIG. 23, the computer system 2300 comprises a central processing unit (CPU) 2301. The CPU 2301 may perform various appropriate actions and processing according to a program stored in a read-only memory (ROM) 2302 or a program loaded from a storage portion 2308 into a random access memory (RAM) 2303. The RAM 2303 further stores various programs and data required for operating the system. The CPU 2301, the ROM 2302, and the RAM 2303 are connected to each other through a bus 2304. An input/output (I/O) interface 2305 is also connected to the bus 2304.

The following components are connected to the I/O interface 2305: an input part 2306 including a keyboard and a mouse, etc.; an output part 2307 including a cathode ray tube (CRT), a liquid crystal display (LCD), a speaker, or the like; a storage part 2308 including hard disk, or the like; and a communication part 2309 including a network interface card such as a local area network (LAN) card, a modem, or the like. The communication part 2309 performs communication processing by using a network such as the Internet. A drive 2310 is also connected to the I/O interface 2305 as required. A removable medium 2311, such as a magnetic disk, an optical disc, a magneto-optical disk, or a semiconductor memory, is installed on the drive 2310 as required, so that a computer program read from the removable medium is installed into the storage part 2308 as required.

Particularly, according to an embodiment of the present disclosure, the processes described in each method by referring to the flowcharts may be implemented as computer software programs. For example, an embodiment of the present disclosure includes a computer program product. The computer program product includes a computer program stored in a computer-readable medium. The computer program includes a program code used for performing a method shown in the flowchart. In such an embodiment, the computer program may be downloaded and installed through the communication part 2309 from a network, and/or installed from the removable medium 2311. When the computer program is executed by the CPU 2301, the various functions defined in the system of this application are executed.

It is to be noted that The computer-readable medium shown in the embodiments of the present disclosure may be a computer-readable signal medium or a computer-readable storage medium or any combination thereof. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: An electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal in a baseband or propagated as a part of a carrier wave, the data signal carrying a program code. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code included in the computer-readable medium may be transmitted using any suitable medium, including but not limited to: a wireless medium, a wire medium, or the like, or any suitable combination thereof.

The flowcharts and block diagrams in the accompanying drawings illustrate possible system architectures, functions, and operations that may be implemented by a system, a method, and a computer program product according to various embodiments of the present disclosure. In this regard, each box in the flowchart or the block diagram may represent a module, a program segment, or a part of code. The module, the program segment, or the part of code comprises one or more executable instructions used for implementing specified logic functions. In some implementations used as substitutes, functions marked in boxes may alternatively occur in a sequence different from that marked in an accompanying drawing. For example, two boxes shown in succession may actually be performed basically in parallel, and sometimes the two boxes may be performed in a reverse sequence. This is determined by a related function. Each box in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Although a plurality of modules or units of a device configured to perform actions are discussed in the foregoing detailed description, such division is not mandatory. Actually, according to the implementations of the present disclosure, the features and functions of two or more modules or units described above may be specified in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions of the embodiments of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the present disclosure.

Other embodiments of the present disclosure will be apparent to a person skilled in the art from consideration of the specification and practice of the disclosure here. This application is intended to cover any variation, use, or adaptive change of the present disclosure. These variations, uses, or adaptive changes follow the general principles of the present disclosure and include common general knowledge or common technical means in the art that are not disclosed in the present disclosure.

It is to be understood that the present disclosure is not limited to the precise structures described above and shown in the accompanying drawings, and various modifications and changes can be made without departing from the scope of the present disclosure. The scope of the present disclosure is limited by the appended claims only. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the pre-defined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for setting virtual keys on a user interface performed at an electronic device, the method comprising:
   determining, in response to at least two touch operations acting on a user interface, at least two pieces of operation position information of the at least two touch operations;
   identifying, according to the at least two pieces of operation position information, a target virtual key on the user interface;
   obtaining a target vibration waveform corresponding to the target vibration key, and performing waveform similarity calculation on the target vibration waveform and other vibration waveforms adapted to at least one other virtual key on the user interface to obtain a waveform difference value; and
   when the waveform difference value is greater than a predefined threshold, determining that the target vibration waveform is associated with the target virtual key.

2. The method according to claim 1, wherein the performing waveform similarity calculation on the target vibration waveform and other vibration waveforms adapted to at least one other virtual key on the user interface to obtain a waveform difference value comprises:
   performing parameter collection processing on the other vibration waveforms to obtain a reference waveform parameter; and
   performing parameter collection processing on the target vibration waveform to obtain a target waveform parameter, and performing waveform similarity calculation on the target waveform parameter and the reference waveform parameter to obtain the waveform difference value.

3. The method according to claim 2, wherein the target waveform parameter comprises a target waveform frequency and a target waveform intensity, the reference waveform parameter comprises a reference waveform frequency and a reference waveform intensity, and the waveform difference value comprises a frequency difference value and an intensity difference value, and the performing waveform similarity calculation on the target waveform parameter and the reference waveform parameter to obtain the waveform difference value comprises:

performing waveform similarity calculation on the target waveform frequency and the reference waveform frequency to obtain the frequency difference value; and performing waveform similarity calculation on the target waveform intensity and the reference waveform intensity to obtain the intensity difference value.

4. The method according to claim 1, wherein the identifying, according to the at least two pieces of operation position information, a target virtual key on the user interface comprises:

determining, according to the at least two pieces of operation position information, at least one operation position distance between the at least two touch operations, and determining a target position distance in the at least one operation position distance;

determining, in response to a preset position distance threshold being greater than the target position distance, that touch operations corresponding to the target position distance are valid touch operations in the at least two touch operations;

determining a number of touches of the valid touch operations in the at least two touch operations; and determining, in response to the number of touches of the valid touch operations being equal to or greater than a preset number threshold, that a virtual key corresponding to a predefined touch region defined by operation position information of the valid touch operations is the target virtual key on the user interface.

5. The method according to claim 1, wherein the identifying, according to the at least two pieces of operation position information, a target virtual key on the user interface comprises:

determining a region center point of a predefined touch region on the user interface according to the at least two pieces of operation position information and a region parameter corresponding to the region center point; and identifying the target virtual key according to the region center point and the region parameter.

6. The method according to claim 5, wherein the method further comprises:

determining, during use of the virtual keys, a plurality of pieces of key position information acting on the virtual keys, and performing density clustering on the plurality of pieces of key position information according to a density of spatial distribution to obtain at least two touch point groups;

determining a group center point in the at least two touch point groups, and performing position distance calculation on the group center point and the region center point to obtain a center point distance; and updating, according to the center point distance, the virtual keys.

7. The method according to claim 1, wherein the identifying, according to the at least two pieces of operation position information, a target virtual key on the user interface comprises:

determining at least two abscissa values comprised in the at least two pieces of operation position information, and determining a target abscissa value in the at least two abscissa values;

determining at least two ordinate values comprised in the at least two pieces of operation position information, and determining a target ordinate value in the at least two ordinate values; and determining a predefined touch region on the user interface according to the target abscissa value and the target ordinate value as corresponding to the target virtual key.

8. An electronic device, comprising:

a processor and a memory, configured to store executable instructions of the processor;

the processor being configured to perform a method for setting virtual keys on a user interface by executing the executable instructions, the method including:

determining, in response to at least two touch operations acting on a user interface, at least two pieces of operation position information of the at least two touch operations;

identifying, according to the at least two pieces of operation position information, a target virtual key on the user interface;

obtaining a target vibration waveform corresponding to the target vibration key, and performing waveform similarity calculation on the target vibration waveform and other vibration waveforms adapted to at least one other virtual key on the user interface to obtain a waveform difference value; and when the waveform difference value is greater than a predefined threshold, determining that the target vibration waveform is associated with the target virtual key.

9. The electronic device according to claim 8, wherein the performing waveform similarity calculation on the target vibration waveform and other vibration waveforms adapted to at least one other virtual key on the user interface to obtain a waveform difference value comprises:

performing parameter collection processing on the other vibration waveforms to obtain a reference waveform parameter; and performing parameter collection processing on the target vibration waveform to obtain a target waveform parameter, and performing waveform similarity calculation on the target waveform parameter and the reference waveform parameter to obtain the waveform difference value.

10. The electronic device according to claim 9, wherein the target waveform parameter comprises a target waveform frequency and a target waveform intensity, the reference waveform parameter comprises a reference waveform frequency and a reference waveform intensity, and the waveform difference value comprises a frequency difference value and an intensity difference value, and the performing waveform similarity calculation on the target waveform parameter and the reference waveform parameter to obtain the waveform difference value comprises:

performing waveform similarity calculation on the target waveform frequency and the reference waveform frequency to obtain the frequency difference value; and performing waveform similarity calculation on the target waveform intensity and the reference waveform intensity to obtain the intensity difference value.

11. The electronic device according to claim 8, wherein the identifying, according to the at least two pieces of operation position information, a target virtual key on the user interface comprises:

determining, according to the at least two pieces of operation position information, at least one operation position distance between the at least two touch operations, and determining a target position distance in the at least one operation position distance;

determining, in response to a preset position distance threshold being greater than the target position distance, that touch operations corresponding to the target position distance are valid touch operations in the at least two touch operations;

determining a number of touches of the valid touch operations in the at least two touch operations; and determining, in response to the number of touches of the valid touch operations being equal to or greater than a preset number threshold, that a virtual key corresponding to a predefined touch region defined by operation position information of the valid touch operations is the target virtual key on the user interface.

12. The electronic device according to claim 8, wherein the identifying, according to the at least two pieces of operation position information, a target virtual key on the user interface comprises:

determining a region center point of a predefined touch region on the user interface according to the at least two pieces of operation position information and a region parameter corresponding to the region center point; and identifying the target virtual key according to the region center point and the region parameter.

13. The electronic device according to claim 12, wherein the method further comprises:

determining, during use of the virtual keys, a plurality of pieces of key position information acting on the virtual keys, and performing density clustering on the plurality of pieces of key position information according to a density of spatial distribution to obtain at least two touch point groups;

determining a group center point in the at least two touch point groups, and performing position distance calculation on the group center point and the region center point to obtain a center point distance; and updating, according to the center point distance, the virtual keys.

14. The electronic device according to claim 8, wherein the identifying, according to the at least two pieces of operation position information, a target virtual key on the user interface comprises:

determining at least two abscissa values comprised in the at least two pieces of operation position information, and determining a target abscissa value in the at least two abscissa values;

determining at least two ordinate values comprised in the at least two pieces of operation position information, and determining a target ordinate value in the at least two ordinate values; and determining a predefined touch region on the user interface according to the target abscissa value and the target ordinate value as corresponding to the target virtual key.

15. A non-transitory computer-readable storage medium, storing executable instructions, wherein the executable instructions, when executed by a processor of an electronic device, causing the electronic device to perform a method for setting virtual keys on a user interface, the method including:

determining, in response to at least two touch operations acting on a user interface, at least two pieces of operation position information of the at least two touch operations;

identifying, according to the at least two pieces of operation position information, a target virtual key on the user interface;

obtaining a target vibration waveform corresponding to the target vibration key, and performing waveform similarity calculation on the target vibration waveform and other vibration waveforms adapted to at least one other virtual key on the user interface to obtain a waveform difference value; and when the waveform difference value is greater than a predefined threshold, determining that the target vibration waveform is associated with the target virtual key.

16. The non-transitory computer-readable storage medium according to claim 15, wherein the performing waveform similarity calculation on the target vibration waveform and other vibration waveforms adapted to at least one other virtual key on the user interface to obtain a waveform difference value comprises:

performing parameter collection processing on the other vibration waveforms to obtain a reference waveform parameter; and performing parameter collection processing on the target vibration waveform to obtain a target waveform parameter, and performing waveform similarity calculation on the target waveform parameter and the reference waveform parameter to obtain the waveform difference value.

17. The non-transitory computer-readable storage medium according to claim 16, wherein the target waveform parameter comprises a target waveform frequency and a target waveform intensity, the reference waveform parameter comprises a reference waveform frequency and a reference waveform intensity, and the waveform difference value comprises a frequency difference value and an intensity difference value, and the performing waveform similarity calculation on the target waveform parameter and the reference waveform parameter to obtain the waveform difference value comprises:

performing waveform similarity calculation on the target waveform frequency and the reference waveform frequency to obtain the frequency difference value; and performing waveform similarity calculation on the target waveform intensity and the reference waveform intensity to obtain the intensity difference value.

18. The non-transitory computer-readable storage medium according to claim 15, wherein the identifying, according to the at least two pieces of operation position information, a target virtual key on the user interface comprises:

determining, according to the at least two pieces of operation position information, at least one operation position distance between the at least two touch operations, and determining a target position distance in the at least one operation position distance;

determining, in response to a preset position distance threshold being greater than the target position distance, that touch operations corresponding to the target position distance are valid touch operations in the at least two touch operations;

determining a number of touches of the valid touch operations in the at least two touch operations; and determining, in response to the number of touches of the valid touch operations being equal to or greater than a preset number threshold, that a virtual key corresponding to a predefined touch region defined by operation position information of the valid touch operations is the target virtual key on the user interface.

19. The non-transitory computer-readable storage medium according to claim 15, wherein the identifying, according to the at least two pieces of operation position information, a target virtual key on the user interface comprises:

determining a region center point of a predefined touch region on the user interface according to the at least two pieces of operation position information and a region parameter corresponding to the region center point; and identifying the target virtual key according to the region center point and the region parameter.

20. The non-transitory computer-readable storage medium according to claim 15, wherein the identifying, according to the at least two pieces of operation position information, a target virtual key on the user interface comprises:

determining at least two abscissa values comprised in the at least two pieces of operation position information, and determining a target abscissa value in the at least two abscissa values;

determining at least two ordinate values comprised in the at least two pieces of operation position information, and determining a target ordinate value in the at least two ordinate values; and determining a predefined touch region on the user interface according to the target abscissa value and the target ordinate value as corresponding to the target virtual key.

\* \* \* \* \*